(12) United States Patent
Campbell et al.

(10) Patent No.: US 9,904,692 B2
(45) Date of Patent: *Feb. 27, 2018

(54) SYSTEM AND METHOD FOR CREATING CUSTOM COMPOSITE IMAGES FROM LAYERED IMAGES IN A CLIENT-SERVER ENVIRONMENT

(71) Applicant: Adobe Systems Incorporated, San Jose, CA (US)

(72) Inventors: Gabriel Matthew Campbell, Dublin, CA (US); Gregory Alan Kaplan, Seattle, WA (US); Andreas Martin Morgen, Seattle, WA (US)

(73) Assignee: Adobe Systems Incorporated, San Jose, CA (US)

( * ) Notice: Subject to any disclaimer, the term of this patent is extended or adjusted under 35 U.S.C. 154(b) by 75 days.

This patent is subject to a terminal disclaimer.

(21) Appl. No.: 14/839,208

(22) Filed: Aug. 28, 2015

(65) Prior Publication Data
US 2015/0370832 A1 Dec. 24, 2015

Related U.S. Application Data

(63) Continuation of application No. 13/414,942, filed on Mar. 8, 2012, now Pat. No. 9,177,401.

(51) Int. Cl.
| | | |
|---|---|---|
| *G06K 9/36* | (2006.01) | |
| *G06K 9/60* | (2006.01) | |
| *G09G 5/00* | (2006.01) | |
| *H04N 9/74* | (2006.01) | |
| *G06F 17/30* | (2006.01) | |
| *G06T 11/60* | (2006.01) | |

(Continued)

(52) U.S. Cl.
CPC .. *G06F 17/30268* (2013.01); *G06F 17/30864* (2013.01); *G06T 11/60* (2013.01); *H04L 67/10* (2013.01); *H04L 67/42* (2013.01)

(58) Field of Classification Search
None
See application file for complete search history.

(56) References Cited

U.S. PATENT DOCUMENTS 5,880,740 A * 3/1999 Halliday ................. G06T 11/60
345/629
6,167,382 A * 12/2000 Sparks ............... G06Q 30/0277
705/14.73

(Continued)

*Primary Examiner* — Randolph I Chu
(74) *Attorney, Agent, or Firm* — Kilpatrick Townsend & Stockton LLP

(57) ABSTRACT

In response to receiving a request from a client device, a first image can be determined based at least in part on an image identification in the request. The first image may be associated with a plurality of layers. A subset of the plurality of layers can be determined. Information configured to enable a selection of at least one layer in the subset may be sent to the client device. In response to receiving a request from a client device, a composite image can be obtained based at least in part on a selection of at least one layer of a plurality of layers of an image received in the request. The composite image may be dynamically generated or retrieved from a storage device. The composite image and/or information associated with the composite image can be sent to the client device.

20 Claims, 14 Drawing Sheets

(51) Int. Cl.
*H04L 29/08* (2006.01)
*H04L 29/06* (2006.01)

(56) References Cited

U.S. PATENT DOCUMENTS

| | | | | |
|---|---|---|---|---|
| 6,310,627 | B1* | 10/2001 | Sakaguchi | A41H 3/007 345/630 |
| 6,344,853 | B1* | 2/2002 | Knight | G06Q 10/087 345/629 |
| 6,803,923 | B1* | 10/2004 | Hamburg | G06T 15/503 345/629 |
| 6,826,727 | B1* | 11/2004 | Mohr | G06F 17/211 382/180 |
| 6,931,591 | B1* | 8/2005 | Brown | G06F 17/24 345/619 |
| 7,079,158 | B2* | 7/2006 | Lambertsen | A45D 44/005 345/592 |
| 7,216,092 | B1* | 5/2007 | Weber | G06Q 10/087 358/1.13 |
| 7,619,638 | B2* | 11/2009 | Walker, Jr. | G06T 11/00 345/629 |
| 8,380,005 | B1* | 2/2013 | Jonsson | G06T 11/60 382/282 |
| 8,582,182 | B2* | 11/2013 | Zahnert | G06T 1/00 345/634 |
| 8,619,148 | B1* | 12/2013 | Watts | G06T 5/006 348/218.1 |
| 8,849,692 | B1* | 9/2014 | Rosenstein | G06F 17/24 705/14.4 |
| 2002/0054115 | A1* | 5/2002 | MacK | G06T 11/60 715/765 |
| 2002/0118218 | A1* | 8/2002 | Voticky | G06T 11/60 345/629 |
| 2003/0055871 | A1* | 3/2003 | Roses | G06F 17/3089 709/203 |
| 2006/0078173 | A1* | 4/2006 | Isomura | G06T 11/60 382/118 |
| 2006/0239534 | A1* | 10/2006 | Sumida | G02B 21/367 382/133 |
| 2007/0011271 | A1* | 1/2007 | Baker | G06F 17/30241 709/217 |
| 2009/0257681 | A1* | 10/2009 | Matsubara | G06T 11/00 382/284 |
| 2010/0142851 | A1* | 6/2010 | Conlon | G06T 11/60 382/282 |
| 2010/0254672 | A1* | 10/2010 | Gottlieb | H04N 7/15 386/278 |
| 2012/0039534 | A1* | 2/2012 | Malik | H03M 7/3064 382/173 |
| 2012/0106869 | A1* | 5/2012 | Machitani | H04N 5/23254 382/284 |
| 2012/0163714 | A1* | 6/2012 | Cvetkovic | G09C 5/00 382/166 |
| 2013/0016921 | A1* | 1/2013 | Beltowski | G06T 11/60 382/305 |
| 2013/0236119 | A1* | 9/2013 | Campbell | G06T 11/60 382/284 |
| 2014/0029868 | A1* | 1/2014 | Lorenz | G06T 11/00 382/302 |

* cited by examiner

SYSTEM AND METHOD FOR CREATING CUSTOM COMPOSITE IMAGES FROM LAYERED IMAGES IN A CLIENT-SERVER ENVIRONMENT

CROSS-REFERENCE TO RELATED APPLICATION

This application is a continuation application of U.S. patent application Ser. No. 13/414,942 filed on Mar. 8, 2012, the contents of which are incorporated herein in their entirety.

FIELD OF THE INVENTION

This disclosure relates generally to creating composite images and more particularly relates to creating a composite image from a layered image in a client-server network, or other multi-device environment.

BACKGROUND

Traditionally, creating a composite image from a layered image required a user to have a desktop application capable of importing a layered image, editing layers of the image, and exporting a flattened image. However, computing devices, such as a mobile phone or tablet computer, may lack the processing power needed to efficiently create a composite image from a layered image. Furthermore, such computing devices may have a screen size which makes creating a composite image difficult for a user. Accordingly, there is a need for efficient and scalable technologies that allow composite images to be created from layered images in these and other circumstances.

SUMMARY

One exemplary embodiment involves receiving a first request from a client device. In this embodiment, the first request comprises an image identification. In response to receiving the first request, a first image based at least in part on the image identification is determined. In an embodiment, the first image comprises a plurality of layers. A first subset of the plurality of layers is determined. In an embodiment, first information is sent to the client device where the first information corresponds to at least one of the layers in the first subset. The first information can be configured to enable a selection of at least one layer in the first subset.

Another embodiment involves receiving a second request from the client device. In one embodiment, the second request comprises a selection of at least one layer in the first subset. In response to receiving the second request, a composite image is obtained. The composite image can be based at least at least in part on the selection of the at least one layer in the first subset. Second information can be sent to the client device. In one embodiment, the second information comprises the composite image.

These illustrative features are mentioned not to limit or define the disclosure, but to provide examples to aid understanding thereof. Additional embodiments are discussed in the Detailed Description, and further description is provided there. Advantages offered by one or more of the embodiments may be further understood by examining this specification or by practicing one or more embodiments presented.

BRIEF DESCRIPTION OF THE FIGURES

These and other features, aspects, and advantages of the present disclosure are better understood when the following Detailed Description is read with reference to the accompanying drawings, where.

DETAILED DESCRIPTION

Figure 1:
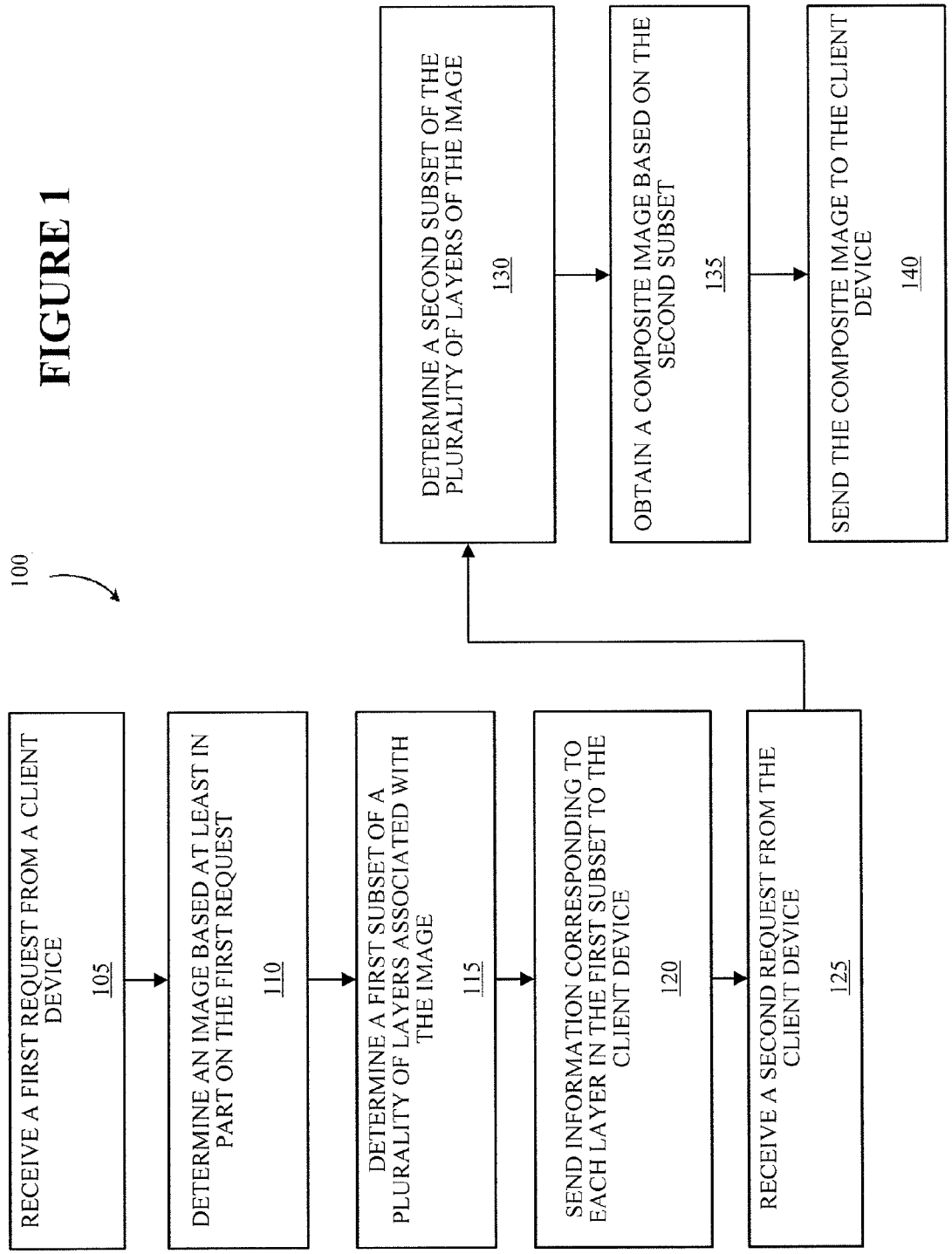
FIG. 1 is a flow chart illustrating a method of receiving and responding to a request to create a composite image according to an embodiment.

Systems and methods disclosed herein relate generally to creating composite images and more particularly relate to creating a composite image from a layered image in a client-server environment. For example, FIG. 1 illustrates a flow chart directed to a method 100 of receiving and responding to requests from a client device associated with creating a composite image from a layered image according to an embodiment. Such requests may be made by one or more client devices, such as client devices 220-240 shown in FIG. 2, to one or more servers, such as server 250 shown in FIG. 2. In response to receiving a request from a client device, a server, such as server 250 shown in FIG. 2, may respond to the request by sending information related to the request to the client device.

The method 100 shown in FIG. 1 begins in block 105 when a first request is received by a server from a client device. For example, a server may receive a hypertext transfer protocol (HTTP) request from a tablet computer over the Internet.

In response to receiving the request 105, the server determines an image based at least in part on the first request 110. The image may comprise or be associated with a plurality of layers. For example, a server may receive a request over HTTP from a mobile phone. In this embodiment, the request includes a Uniform Resource Identifier (URI) which the server analyzes to determine that the request corresponds to a request for an image associated with an image identifier specified in the request. For example, a URI included in a request may include "imageId=1234". In this embodiment, the server may parse or otherwise analyze the URI to determine that the request corresponds to an image associated with an image identifier of "1234".

After determining an image based at least in part on the first request 110, the server determines a first subset of a plurality of layers associated with the image 115. For example, an image may be associated with two, three, four, or more image layers. In this embodiment, the determined subset of the plurality of layers can include every image layer associated with the image. In other embodiments, the determined subset of the plurality of layers may include a portion of the total number of layers associated with an image. The determined subset of layers may be based at least in part on information received in the request. For example, a URI included in the request may include "imageLayers=1, 3, 4". In this embodiment, an image associated with a request may have five layers, and the determined subset of layers may include layer 1, layer 3, and layer 4 of the image based on the URI received in the request.

After determining the first subset of the plurality of layers associated with the image 115, the server sends information corresponding to each layer in the subset to the client device 120. The information can be sent in a single file or as multiple files. For example, in one embodiment, information corresponding to each layer in the subset is sent in a single HTML file to the client device. The information sent to the client device can include information about each layer in the subset. For example, the information may include a title or description, or both, for one or more layers in the subset of layers. The information sent to the client device may include markup, code, scripts, or other information usable by the client device to determine a user selection of one or more layers in the subset. In one embodiment, the information sent to the client device includes a layer image for each layer in the subset. In this embodiment, the layer images may be sent to the client device at full resolution (e.g., the same resolution as the layer image is stored on the server) or at full size, or both. In other embodiments, the layer images may be sent to the client device at a lower resolution or a smaller size, or both.

In one embodiment, the information sent to a client device includes an HTML file. In this embodiment, the HTML file can comprise markup that includes a thumbnail image of each layer in the subset, a title of each layer in the subset, and a checkbox for each layer in the subset where the checkbox indicates whether that layer is currently selected. At least a portion of the information received by the client device may be rendered on a display associated with the client device. For example, the server may send an HTML file containing information corresponding to each layer in the first subset to a tablet computer over HTTP if the tablet computer sent the first request to the server. The tablet computer may receive the HTML file and render at least a portion of the information contained in the HTML file on a display associated with the tablet.

In embodiments, the client device receives user selection of one or more layers. For example, if a tablet computer receives information related to three layers of an image from a server, then the tablet computer may render at least a portion of the information on a display associated with the tablet computer. In one embodiment, the tablet computer renders an image for each layer received. Thus, if the tablet receives information related to three layers of an image, then three different images may be rendered on the display of the tablet computer. Each of the three images may correspond to one of the three layers. In addition, each image may be associated with an indication of whether the image corresponding to that layer has been selected. For example, in one embodiment, each image for each layer is associated with a different checkbox. In this embodiment, if a particular checkbox is checked, then the image associated with that layer is selected. Thus, in this embodiment, a user may select or deselect a particular layer by checking or unchecking the checkbox associated with that layer.

In another embodiment, each image corresponding to a particular layer that is selected may have an image border and each image corresponding to a particular layer that is not selected may be borderless. Thus, if the client device comprises a touch-sensitive display, a user may select or deselect a particular layer by contacting the touch-sensitive display at a location corresponding to that layer. For example, if a user touches the touch-sensitive display at a location corresponding to an image associated with a layer and the layer was previously selected, then the layer may be unselected and the display may be updated to remove the image border for the image, thus indicating that the layer has been deselected.

In embodiments, a client device sends a second request to a server. The second request may be sent in response to a user interaction with the device, such as the selection or deselection of one or more layers. For example, if a user checks a checkbox associated with an image layer on a client device, then the client device may send a second request to the server. The second request may include information about one or more layers of an image. For example, the second request may include information indicating that the layer associated with the checkbox that was checked has been selected. In one embodiment, the second request indicates that the request is for a composite image. The composite image may include a flattened image of each of the selected layers.

Referring back to FIG. 1, a server may receive a second request from the client device 125. For example, the server may receive a second request that indicates that the client device wants a composite image. In one embodiment, the server receives a hypertext transfer protocol (HTTP) request from a tablet computer over the Internet.

After receiving the second request from the client device 125, the method 100 proceeds to block 130. In block 130, the server determines a second subset of a plurality of layers of an image. For example, the second request may include information about one or more layers of an image that may be used to create the composite image. In one embodiment, a URI in the second request indicates which layers of an image comprising a plurality of layers should be used to create a composite image. Thus, if a URI specifies "imageId=1234" and "useLayers=1, 3, 4", then the server may determine that the request is for a composite image where the composite image is based on layer 1, layer 3, and layer 4 of an image associated with an image identifier of "1234". Thus, the server may determine that the second subset of layers comprises layer 1, layer 3, and layer 4 of an image.

In another embodiment, the second request indicates that a selection of a particular layer has changed. For example, a URI in the second request may specify "layer3=toggle" which indicates that the selection of layer 3 of an image needs to be changed. In this embodiment, the server may query a database to determine whether the previous state of layer 3 of the image was "selected" or "unselected". If the previous state of layer 3 was "selected", then the database may be updated to reflect that layer 3 is now "unselected". Similarly, if the previous state of layer 3 was "unselected", then the database may be updated to reflect that layer 3 is now "selected". At least a portion of the layers in the second subset may be determined by querying one or more databases. For example, the server may query a database to determine which layers of an image are "selected" and include these layers in the second subset.

After determining a second subset of the plurality of layers of the image 130, the method 100 proceeds to block 135. In block 135 a composite image is obtained based on the second subset of layers. A composite image may be obtained in any number of ways. In one embodiment, a composite image is generated based at least in part on the second subset of layers. For example, if a request indicates that a composite image needs to be sent to a client device and that the composite image needs to be based on layers 1, 6, and 9 of an image, then the server may generate the composite image by combining layers 1, 6, and 9 of the image to create the composite image. In one embodiment, the composite image is generated in response to receiving the second request. In other embodiments, the composite image is generated on-the-fly. In embodiments, the server may store the composite image in cache, memory, on a disk drive, in a data store, or a combination thereof.

In one embodiment, a composite image is obtained from cache, memory, on a disk drive, in a data store, or a combination thereof. For example, a composite image based on the second subset of layers may have previously been created and stored on a server. In this embodiment, the composite image may be obtained based on information contained in the second request. Thus, referring to the example above, if a composite image that combines layers 1, 6, and 9 already exists and is accessible by the server, then the server may obtain the composite image.

After obtaining the composite image 135, the server sends the composite image to the client device 140. For example, the server may send the composite image to a tablet computer over HTTP if the tablet computer sent the second request to the server. In one embodiment, the composite image is sent to the client device at full resolution (e.g., the same resolution as the composite image generated and/or stored on the server) and at full size (e.g., the same size as the composite image generated and/or stored on the server). In other embodiments, the composite image sent to the client device may be at a lower resolution or a smaller size, or both. In embodiments, the client device may render at least a portion of the received composite image on a display associated with the client device.

These illustrative examples are given to introduce the reader to the general subject matter discussed here and are not intended to limit the scope of the disclosed concepts. The following sections describe various additional embodiments and examples with reference to the drawings in which like numerals indicate like elements. Other embodiments will readily suggest themselves to such skilled persons having the benefit of this disclosure. In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application-related or business-related constraints, or both, and that these specific goals will vary from one implementation to another and from one developer to another.

Illustrative System

Figure 2:
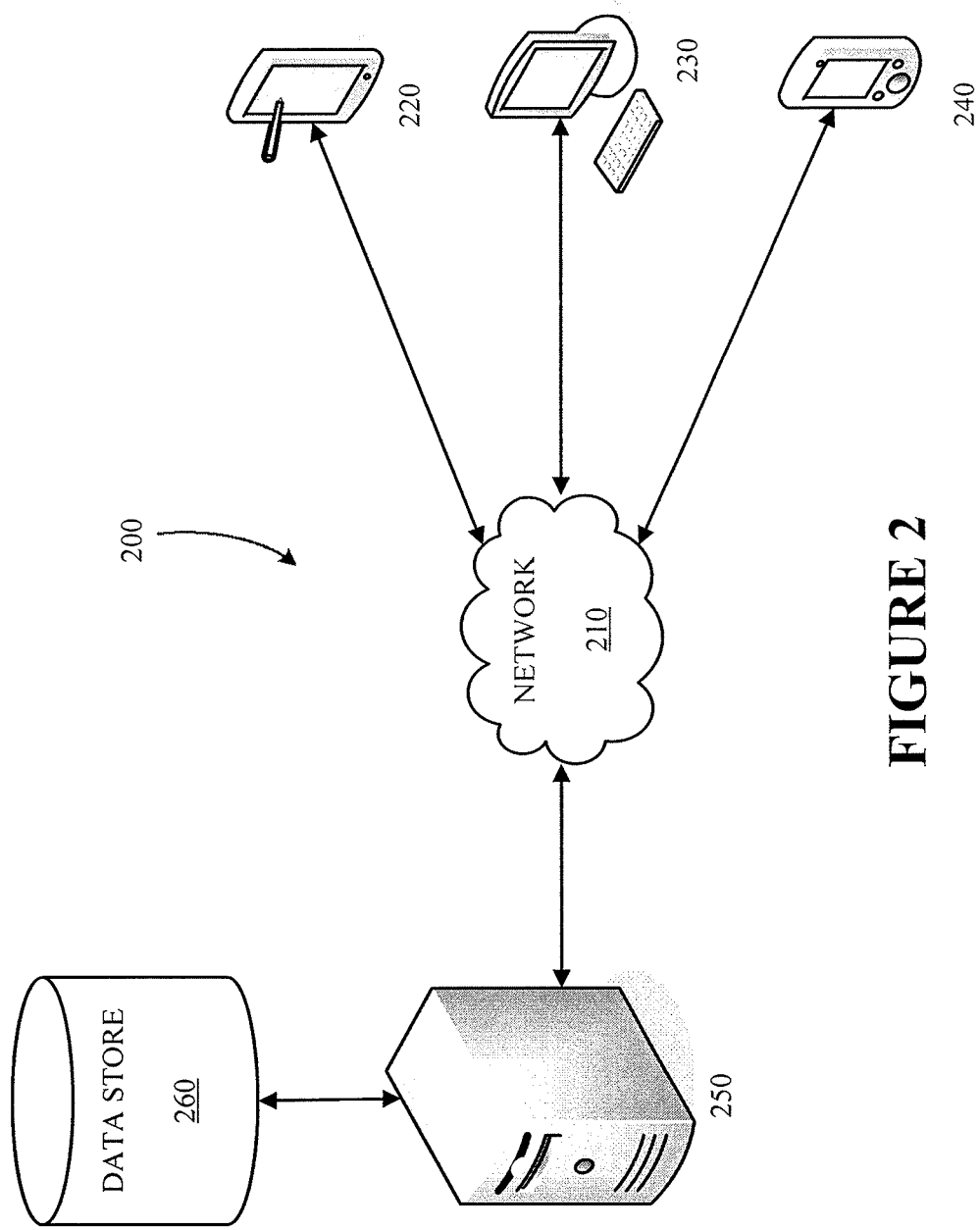
FIG. 2 is a system diagram depicting exemplary computing devices in an exemplary computing environment according to an embodiment.

FIG. 2 illustrates a system diagram depicting exemplary computing devices in an exemplary computing environment according to an embodiment. The system 200 shown in FIG. 2 includes three client devices, 220-240, and a web server 250. Each of the client devices, 220-240, and the web server 250 are connected to a network 210. In this embodiment, each of the client devices, 220-240, is in communication with the web server 250 through the network 210. Thus, each of the client devices, 220-240, can send requests to the web server 250 and receive responses from the web server 250 through the network 210.

In an embodiment, the network 210 shown in FIG. 2 facilitates communications between the client devices, 220-240, and the web server 250. The network 210 may be any suitable number or type of networks or links, including, but not limited to, a dial-in network, a local area network (LAN), wide area network (WAN), public switched telephone network (PSTN), the Internet, an intranet or any combination of hard-wired and/or wireless communication links. In one embodiment, the network 210 may be a single network. In other embodiments, the network 210 may comprise two or more networks. For example, the client devices 220-240 may be connected to a first network and the web server 250 may be connected to a second network and the first and the second network may be connected. Numerous other network configurations would be obvious to a person of ordinary skill in the art.

A client device may be any device capable of communicating with a network, such as network 210, and capable of sending and receiving information to and from another device, such as web server 250. For example, in FIG. 2, one client device may be a tablet computer 220. The tablet computer 220 may include a touch-sensitive display and be able to communicate with the network 210 by using a wireless network interface card. Another device that may be a client device shown in FIG. 2 is a desktop computer 230. The desktop computer 230 may be in communication with a display and be able to connect to the network 230 through a wired network connection. The desktop computer 230 may be in communication with any number of input devices such as a keyboard of a mouse. In FIG. 2, a mobile phone 240 may be a client device. The mobile phone 240 may be able to communicate with the network 210 over a wireless communications means such as TDMA, CDMA, GSM, or WiFi.

A device receiving a request from another device may be any device capable of communicating with a network, such as network 210, and capable of sending and receiving information to and from another device. For example, in the embodiment shown in FIG. 2, the web server 250 may be a device receiving a request from another device (i.e. client devices 220-240) and may be in communication with network 210. A receiving device may be in communication with one or more additional devices, such as additional servers. For example, web server 250 in FIG. 2 may be in communication with another server that stores full resolution images, lower resolution copies of full resolution images, one or more layers of an image, thumbnail images, information associated with one or more images, user account information etc. In one embodiment, the web server 250 may store images comprising a plurality of layers, images associated with one or more layers of another image, thumbnail images of other images, composite images, other images or information associated with images, or some combination thereof on a disk drive or in cache, or both. In an embodiment, a web server may communicate with one or more additional devices to process a request received from a client device. For example, web server 250 in FIG. 2 may be in communication with a plurality of additional servers, at least one of which may be used to process at least a portion of a request from any of the client devices 220-240. In one embodiment, web server 250 may be part of or in communication with a content distribution network (CDN) that stores data related to one or more images.

One or more devices may be in communication with a data store. In FIG. 2, web server 250 is in communication with data store 260. In embodiments, data store 260 is operable to receive instructions from web server 250 and/or other devices in communication with data store 260 and obtain, update, or otherwise process data in response to receiving the instructions. Data store 260 may contain information associated with images having a plurality of layers, one or more layers of an image, full resolution images, reduced resolution images, full sized images, reduced sized images, composite images, thumbnail images, image location, account information, etc. For example, data store 260 may contain an image identifier that is usable to determine a location where the image is stored. Data store 260 may contain layer identifiers that are usable to identify one or more layers associated with an image. In one embodiment, a layer identifier is usable to determine a location where a thumbnail image of the layer is stored.

Data store 260 shown in FIG. 2 can receive requests from web server 250 and send responses to web server 250. For example, web server 250 may request a listing of the layers associated with an image corresponding to a particular image identifier. As another example, web server 250 may request the name of an image having a layer corresponding to a particular layer identifier. In response to receiving the request, data store 260 may send the requested information about one or more images, one or more layers of an image, and/or other information to web server 250. In embodiments, data store 260 can send receive, add, update, or otherwise manipulate information based at least in part on one or more requests received from another device or network, such as web server 250, network 210, or another network or device in communication with data store 260. For example, web server 250 may query data store 260 to determine whether information associated with a particular layer of an image should be sent to a client device in response to the web server 250 receiving a request from the client device.

Illustrative Requesting or Receiving Device

Figure 3:
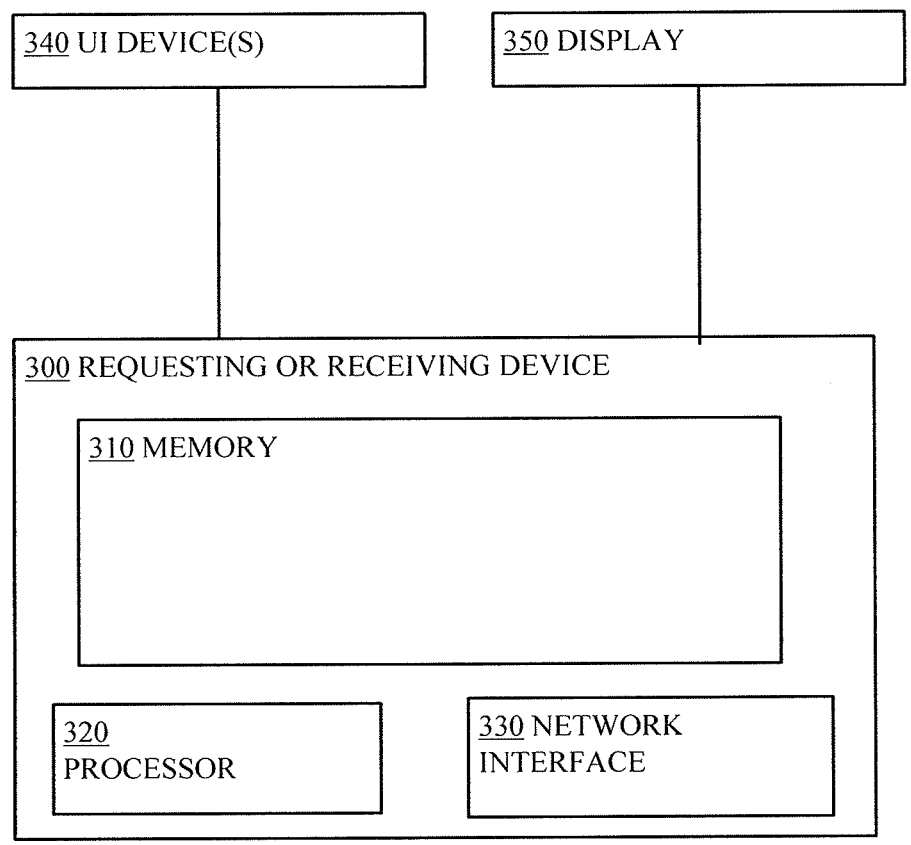
FIG. 3 is a block diagram depicting an exemplary requesting or receiving device according to an embodiment.

FIG. 3 is a block diagram depicting an exemplary requesting or receiving device according to an embodiment. For example, in one embodiment, the device 300 may be a web server, such as the web server 250 shown in FIG. 2. The web server may be in communication with one or more additional devices such as an external hard drive or other servers. In an embodiment, the web server is capable of responding to requests from client devices for information associated with a subset of a plurality of layers associated with an image comprising a plurality of layers. In other embodiments, the web server is capable of responding to requests from client devices for a composite image based on a subset of layers associated with an image comprising a plurality of layers. In other embodiments, device 300 may be a client device, such as the client devices 220-240 shown in FIG. 2. In various embodiments, device 300 may be a tablet computer, desktop computer, mobile phone, personal digital assistant (PDA), or a server such as a web server, media server, or both.

As shown in FIG. 3, the device 300 comprises a computer-readable medium such as a random access memory (RAM) 310 coupled to a processor 320 that executes computer-executable program instructions and/or accesses information stored in memory 310. A computer-readable medium may comprise, but is not limited to, an electronic, optical, magnetic, or other storage device capable of providing a processor with computer-readable instructions. Other examples comprise, but are not limited to, a floppy disk, CD-ROM, DVD, magnetic disk, memory chip, ROM, RAM, SRAM, DRAM, CAM, DDR, flash memory such as NAND flash or NOR flash, an ASIC, a configured processor, optical storage, magnetic tape or other magnetic storage, or any other medium from which a computer processor can read instructions. In one embodiment, the device 300 may comprise a single type of computer-readable medium such as random access memory (RAM). In other embodiments, the device 300 may comprise two or more types of computer-readable medium such as random access memory (RAM), a disk drive, and cache. The device 300 may be in communication with one or more external computer-readable mediums such as an external hard disk drive or an external DVD drive.

The embodiment shown in FIG. 3, comprises a processor 320 which executes computer-executable program instructions and/or accesses information stored in memory 310. The instructions may comprise processor-specific instructions generated by a compiler and/or an interpreter from code written in any suitable computer-programming language including, for example, C, C++, C#, Visual Basic, Java, Python, Perl, JavaScript, and ActionScriptOO. In an embodiment, the device 200 comprises a single processor 320. In other embodiments, the device 300 comprises two or more processors.

The device 300 as shown in FIG. 3 comprises a network interface 330 for communicating via wired or wireless communication. For example, the network interface 230 may allow for communication over networks via Ethernet, IEEE 802.11 (Wi-Fi), 802.16 (Wi-Max), Bluetooth, infrared, etc. As another example, network interface 330 may allow for communication over networks such as CDMA, GSM, UMTS, or other cellular communication networks. The device 300 may comprise two or more network interfaces 330 for communication over one or more networks.

The device 300 may comprise or be in communication with a number of external or internal devices such as a mouse, a CD-ROM, DVD, a keyboard, a display, audio speakers, one or more microphones, or any other input or output devices. For example, the device 300 shown in FIG. 3 is in communication with various user interface devices 340 and a display 350. Display 350 may use any suitable technology including, but not limited to, LCD, LED, CRT, and the like.

Device 300 may be a server, a desktop, a tablet, a personal computing device, a mobile device, or any other type of electronic devices appropriate for providing one or more of the features described herein.

Figure 4:
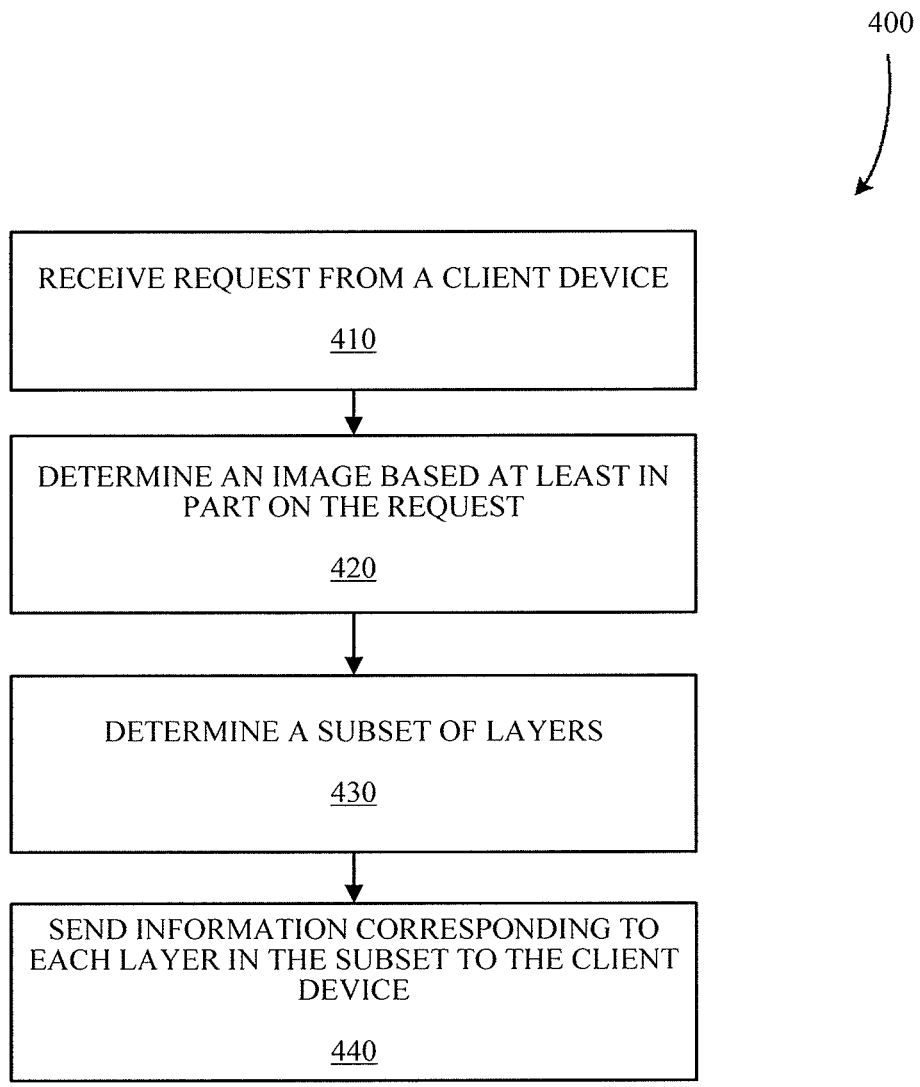
FIG. 4 is a flow chart illustrating a method of receiving and responding to a request for information corresponding to layers of an image according to an embodiment.

Method of Receiving and Responding to a Request for Information Related to One or More Layers of an Image Referring now to FIG. 4, FIG. 4 illustrates a flow chart directed to a method 400 of receiving and responding to a request for information corresponding to layers of an image according to an embodiment. The description of the method 400 of FIG. 4 will be made with respect to FIG. 2 according to an embodiment.

The method 400 shown in FIG. 4 begins when a request is received from a client device 410. For example, referring to FIG. 2, web server 250 may receive an HTTP request from desktop computer 230 through network 210.

A request may be sent by a client device and received by a server over any number of protocols. In one embodiment, a request is sent by a client device 220-240 and received by the web server 250 through network 210 over Hypertext Transfer Protocol (HTTP). In another embodiment, a request is sent by a client device 220-240 and received by the web server 250 through network 210 over Hypertext Transfer Protocol Secure (HTTPS). A request may be received over HTTP or other stateless transport mechanism. Such a stateless transport mechanism may be associated with a protocol that has at least some characteristics that are similar to HTTP. Numerous additional embodiments and implementations will be obvious to one of skill in the art.

A request may include information usable by the receiving device to determine whether a playlist needs to be generated. In one embodiment, a request includes one or more Uniform Resource Identifiers (URIs). Examples of URIs include, but are not limited to, Uniform Resource Locators (URLs) and Uniform Resource Names (URNs). A URI can have any number of schemes. Examples of URI schemes include, but are not limited to, FTP, H323, HTTP, HTTPS, Real Time Streaming Protocol (RTSP), Real Time Messaging Protocol (RTMP), Java Archive (JAR), User Datagram Protocol (UDP), and Extensible Resource Identifier (XRI). In some embodiments, a URI conforms to RFC 3986 "Uniform Resource Identifier (URI): Generic Syntax" available at http://www.ietf.org/rfc/rfc3986.txt which is hereby incorporated by reference. A request having a URI may contain information including, but not limited to, some or all of the following: a scheme name, user information such as a username or a password or both, a hostname, a port, a path, a query, and a fragment.

Referring back to FIG. 4, after receiving a request from a client device 410, the method 400 proceeds to block 420. In block 420, an image is determined based at least in part on information in the received request. For example, web server 250 may determine an image based at least in part on a request received from tablet computer 220 through network 210.

In determining an image based at least in part on the request, a server receiving a request may parse or otherwise analyze the received request. A server receiving a request may parse or otherwise analyze a URI of a received request. For example, an image may be determined based at least in part on a path specified in a URI of a received request. In one embodiment, at least a portion of a path specified in a request is separated by a delimiter, such as a "/", "&", or ":". In such an embodiment, the path may be used to determine information usable by the server to determine an image. For example, referring to FIG. 2, if "/myImage/" is a path specified in a request received by web server 250, the web server 250 may determine that the image should be an image having the name "myImage". In another embodiment, if a request includes a path "/getImageLayers/myImage/", then a server receiving the request may determine that the request corresponds to a request for one or more layers of an layered image having the name "myImage".

An image may be determined based at least in part on a filename specified in a request. For example, a portion of a URI in a request may be interpretable by a server receiving the request as a filename. As one example, if a server receives a request from a client device and the request contains "imageName=whiteTruck2012", then the server may determine that an image associated with the request has a name of "whiteTruck2012". In some embodiments, the server searches cache, memory, and/or a disk drive to determine whether the server has access to an image having the name of the image specified in the request (i.e., "whiteTruck2012" in the previous example) in determining an image based at least in part on the request.

An image may be determined based at least in part on a location specified in a request. For example, a portion of a URI in a request may be interpretable by a server receiving the request as a location, or part of a location, of an image associated with the request. As one example, if a server receives a request from a client device and the request contains "imageLoc=folder1.folder2.folder3.myImage", then the server may determine that the request is associated with an image having the name "myImage" and that the image is located in a folder named "folder3" and that "folder3" is located within "folder2" and that "folder2" is located within "folder1". In at least this way, the request may specify a location of an image associated with a request that the server can use to determine the image.

An image may be determined based at least in part on an image identifier specified in a request. For example, at least a portion of a URI in a request may be interpretable by a server receiving the request as an image identifier. As one example, if a server receives a request from a client device and the request contains information indicating that the request is associated with an image corresponding to an image identifier of "asdf1234", then the server may determine an image based on the identifier contained in the request. For example, the server may query one or more data stores to determine a location of the image that corresponds with the image identifier of "asdf1234" received in the request. In one embodiment, an image identifier comprises one or more images. For example, in one embodiment, an image is determined because the image is sent in the request. In this embodiment, the image may comprise one or more layers.

An image may be determined based at least in part on information associated with one or more layers of the image received in a request. For example, at least a portion of a URI may be interpretable by a server receiving the request as a layer identifier. As one example, if a server receives a request from a client device and the request includes "toggleLayer=LID140", then the server may determine that the request corresponds to a layer having a layer identifier of "LID140". In this embodiment, the server may query one or more data stores to determine that the layer corresponding to "LID140" is associated with a particular image. For example, in one embodiment, the server can determine an image identifier of an image associated with a layer of an image. In this embodiment, the server can then use the image identifier to query a database to determine an image associated with the request.

An image can be determined based on a file extension specified in a request. For example, a portion of a URI in a request may be interpretable by a server receiving the request as a file extension. In one embodiment, if the path "/folder1/imageName.psd" is received in a request by a server, then the server may determine that the image is a PSD image having the name "imageName". Thus, if the server is able to access a first image having the name "imageName.gif", a second image having the name "imageName.jpg", and a third image having the name "imageName.psd", then the server may determine that the image is the third image having the name "imageName.psd" based at least in part on the file extension specified in the request.

An image may be based on a query or URI fragment, or both, specified in a request. For example, a query or fragment specified in a URI in a request may be interpretable by a server receiving the request to determine an image associated with the request. In one embodiment, a query or fragment, or both, received in a request may be used to specify a file extension that the server uses to determine an image associated with the request. For example, a query or fragment, or both, in a received request may contain the text "fileExt=PSD" which the server uses to determine that the request corresponds to an image having a ".psd" file extension. In another embodiment, a query or URI fragment, or both, received in a request may be used to determine an Internet media type, Multipurpose Internet Mail Extensions (MIME-type), and/or a content-type which the server can use to determine an image. In this embodiment, the server receiving the request may determine at least a portion of an image based on the determined media type, MIME-type, and/or content-type. For example, a query or a fragment received in a request, or some other portion of the request, may contain the text "mimeType=image/photoshop" which the server uses to determine an image associated with the received request.

An image can be determined based on whether a server receiving a request can access a file specified in a request. For example, a request may indicate a client device wants one or more layers of a layered image having a filename of "lakePhoto.psd". In one embodiment, if the server cannot access the file "lakePhoto.psd" stored in a cache, memory, or a disk drive associated with the server, then the server may determine an image that is determined to be close to the requested file. For example, if the server cannot access "lakePhoto.psd" but can access "lakePhoto1.psd", then the server may determine that the image based at least in part on the request is "lakePhoto1.psd". In another embodiment, if the request specifies a file having the name "golfPhoto.jpg" and the server cannot access "golfPhoto.jpg" but can access "golfPhoto.psd", then the server determines that the image is "golfPhoto.psd". In yet another embodiment, the server may determine another image associated with a request even if the server can access the requested file. For example, in one embodiment, the request may specify a file having the name "tennisPhoto.jpg". In this embodiment, the server may be able to access "tennisPhoto.jpg" but the server may determine that the image based at least in part on the request is "tennisPhoto.psd" because the PSD file has multiple layers and the JPG file does not.

An image based at least in part on the request may be determined based at least in part on a combination of two or more of a URI, path, filename, file extension, Internet content type, MIME-type, content-type, protocol, query, fragment, etc. specified in a request. In some embodiments, an image may be determined based at least in part on one or more of a filename, file extension, Internet content type, MIME-type, content-type, or protocol determined by a server receiving the request based at least in part on information contained in the request. For example, a server may access one or more data stores to determine an image associated with a request based at least in part on a received request. Numerous additional embodiments and implementations would be obvious to one of ordinary skill in the art.

Referring back to FIG. 4, after determining an image based at least in part on the request 420, the method 400 proceeds to block 430. In block 430, a subset of layers associated with the image is determined. For example, web server 250 may determine a subset of layers based at least in part on information contained in a request received from mobile phone 230 through network 210.

In determining a subset of layers associated with the image, a server receiving a request may parse or otherwise analyze the received request. A server receiving a request may parse or otherwise analyze a URI of a received request. For example, a subset of layers corresponding to an image may be determined based at least in part on a path specified in a URI of a received request. In one embodiment, at least a portion of a path specified in a request is separated by a delimiter, such as a "/", "&", or ":". In such an embodiment, the path may be used to determine information usable by the server to determine a subset of layers. For example, referring to FIG. 2, if "/layer1/layer5/layer6/" is a path specified in a request received by web server 250, the web server 250 may determine that the subset of layers comprises layer 1, layer 5, and layer 6 associated with the determined image. In another embodiment, if a request includes a path "/getImageLayers/layers1-4/", then a server receiving the request may determine that the subset of layers comprises layer 1, layer 2, layer 3, and layer 4 associated with the determined image.

A subset of layers may be determined based at least in part on a filename specified in a request. For example, a portion of a URI in a request may be interpretable by a server receiving the request as a filename. As one example, if a server receives a request from a client device and the request contains "imageName=whiteTruck2012", then the server may determine that the subset of layers comprises at least a portion of the layers associated with an image having the name "whiteTruck2012". In one embodiment, the server receiving the request may query one or more data stores to determine the subset of layers. For example, referring to FIG. 2, web server 250 may query data store 260 to determine which layers associated with the "whiteTruck2012" image should be included in the subset of layers. In one embodiment, the data store 260 comprises information about each layer of an image that indicates whether information about the layer should be sent in response to a request from a client device. In some embodiments, the server searches cache, memory, and/or a disk drive to determine whether the server has access information corresponding to one or more layers of the determined image having the name of the image specified in the request (i.e., "whiteTruck2012" in the previous example) to determine the subset of layers.

A subset of layers may be determined based at least in part on a location specified in a request. For example, a portion of a URI in a request may be interpretable by a server receiving the request as a location, or part of a location, of one or more layers of an image associated with the request. As one example, if a server receives a request from a client device and the request contains "layerLoc=folder1.folder3", then the server may determine that the layers associated with the image that should be included in the subset of layers are located in a folder named "folder3" and that "folder3" is located within "folder1". In at least this way, the request may specify a location of one or more image layers to be included in the subset of layers.

A subset of layers may be determined based at least in part on one or more layer identifiers specified in a request. For example, at least a portion of a URI in a request may be interpretable by a server receiving the request as a layer identifier. As one example, if a server receives a request from a client device and the request contains information indicating that the request is associated with a layer identifier of "layer4643", then the server may determine to include a layer corresponding to "layer4643" in the subset.

In embodiments, a device receiving a request may query one or more data stores in determining the subset of layers. For example, web server 250 may receive a request from phone 240 and the web server 250 may query data store 260 in determining the subset of layers. In one embodiment, data store 260 comprises information corresponding to images, image layers, access rights, user information, and/or other information usable in determining a subset of layers. For example, the server may query one or more data stores to determine a location of a lower-resolution thumbnail image of a layer corresponding to a layer identifier. In one embodiment, if the web server 250 is unable to access the location of the lower-resolution thumbnail image of the layer, then that layer is not included in the subset. In another embodiment, if the web server 250 is unable to access the location of the lower-resolution thumbnail image of the layer, then the web server 250 may generate the low-resolution thumbnail image by accessing a high-resolution image of the layer and converting the layer into the low-resolution thumbnail image. In this embodiment, the web server 250 may include the layer corresponding to the generated thumbnail image in the subset. As another example, web server 250 can query data store 260 to determine whether a layer is locked. In this embodiment, the web server 250 may determine that the layer should not be included in the subset. In other embodiments, the web server 250 may include the layer in the subset even if the layer is locked in the data store 260. Numerous other embodiments are disclosed herein and others are within the scope of this disclosure.

A subset of layers may be determined based at least in part on information associated with one or more layers or one or more images, or both, received in a request. For example, at least a portion of a URI may be interpretable by a server receiving the request as a layer identifier. As one example, if a server receives a request from a client device and the request includes "useLayer=LID140", then the server may determine that a layer corresponding to the layer identifier of "LID140" should be included in the subset. Conversely, if a server receives a request from a client device and the request includes "doNotUse=LID140", then the server may determine that a layer corresponding to the layer identifier of "LID140" should not be included in the subset. In one embodiment, information received in the request is used to override one or more settings in a data store. For example, information contained in the data store may indicate that a layer associated with layer identifier "LID140" should be included in a subset, but the server may not include the layer in the subset because information in the request indicates that the layer should not be included in the subset. In at least this way, information contained in a request may be used to include or not include one or more layers in a subset that overrides information from another source. In other embodiments, information from another source—such as a data store—may override information contained in a request. For example, in this embodiment, the layer associated with layer identifier "LID140" may be included in the subset even if the request indicates that the layer should not be included in the subset because information in the data store overrides information contained in the request.

A subset of layers may be based on a query or URI fragment, or both, specified in a request. For example, a query or fragment specified in a URI in a request may be interpretable by a server receiving the request to determine whether one or more layers should or should not be included in the subset. In one embodiment, a query or fragment, or both, received in a request may be used to specify a layer to include in the subset of layers. In another embodiment, a query or fragment, or both, received in a request may be used to specify a layer that should not be included in the subset of layers.

A subset of layers may be determined based at least in part on a combination of two or more of a URI, path, filename, file extension, Internet content type, MIME-type, content-type, protocol, query, fragment, etc. specified in a request. In some embodiments, a subset of layers associated with the determined image may be determined based at least in part on one or more of a filename, file extension, Internet content type, MIME-type, content-type, or protocol determined by a server receiving the request based at least in part on information contained in the request. For example, a server may access one or more data stores to determine the layers of an image to be included in the subset. Numerous additional embodiments and implementations would be obvious to one of ordinary skill in the art.

Referring back to FIG. 4, after determining a subset of layers 430, the method 400 proceeds to block 440. In block 440, information corresponding to each layer in the subset is sent to the client device 440. For example, referring to FIG. 2, web server 250 may send information corresponding to each layer in a subset of layers associated with an image to tablet computer 220 through network 210. In some embodiments, information corresponding to each of a portion of the layers in the subset is sent to the client device.

In embodiments, for each layer of at least a portion of the layers the subset, an image is sent to the client device. The image may contain a visual representation of all or a portion of a layer. In one embodiment, a high-resolution image for a layer in the subset is sent to the client device. In another embodiment, a low-resolution image for a layer in the subset is sent to the client device. In one embodiment, a low-resolution image is an image that has 72 dots per inch (dpi). In another embodiment, a low-resolution image is an image that has a dpi of less than 100 dpi. In various embodiments, a low-resolution image can be an image with a dpi of less than 80 dpi, less than 100 dpi, less than 125 dpi, less than 150 dpi, less than 200 dpi, or another dpi threshold that is low-resolution in the context of a particular embodiment. In some embodiments, thumbnail images for one or more layers in the subset are sent to the client device. A combination of high-resolution images, low-resolution images, and/or thumbnail images associated with one or more layers in the subset of layers may be sent to the client device.

In embodiments, a device receiving a request may query one or more data stores to determine information associated with one or more layers in the subset to send to the client device. For example, web server 250 may query data store 260 to determine an image identifier, a layer identifier, an image description, a layer description, image comments, layer comments, an image location, a layer location, a thumbnail layer, a high-resolution image location, a low-resolution image location, an author, a timestamp, or other information associated with a layer in the subset. The web server 250 can query data store 260 to determine information associated with an account of a user associated with the request. For example, the web server 250 may query data store 260 in determining whether a user of a client device is authorized to view information associated with a layer in the subset. If the web server 250 determines that the user is unauthorized to view at least a portion of the information associated with the layer in the subset, then the web server 250 may determine that the portion of the information should not be sent to the client device. In other embodiments, the portion of the information may be sent to the client device, but access to at least a portion of the information or a functionality corresponding to the layer associated with the information may be limited. For example, in one embodiment, if the web server 250 determines that a user is not authorized to select a particular layer in the subset, then the web server 250 may send information corresponding to the layer, but the user may not be able to select or deselect the layer.

In one embodiment, the information sent to a client device includes an HTML file. In this embodiment, the HTML file can comprise markup that includes a thumbnail image of each layer in the subset, a title of each layer in the subset, and a checkbox for each layer in the subset where the checkbox indicates whether that layer is currently selected. At least a portion of the information received by the client device may be rendered on a display associated with the client device. For example, the server may send an HTML file containing information corresponding to one or more layers in the subset to a tablet computer over HTTP if the tablet computer sent the request to the server. The tablet computer may receive the HTML file and render at least a portion of the information contained in the HTML file on a display associated with the tablet.

In embodiments, the information sent to a client device may be configured to enable user interaction with at least a portion of the information sent to the client device. For example, the information sent to the client device may be usable by the client device to allow a user to select one or more layers in the subset. In one embodiment, the information includes program code configured to enable a user to select and/or deselect information corresponding to one or more layers in a subset. Thus, in one embodiment, the information may include Asynchronous JavaScript and XML (AJAX) that enables a user to select one or more layers in the subset, deselect one or more layers in the subset, order one or more layers in the subset, prioritize one or more layers in the subset, respond to other user interactions with at least a portion of the information, or a combination thereof. In one embodiment, the information includes program code configured to provide a visual indication regarding whether one or more layers are selected.

For example, in one embodiment, the information sent to a client device includes a form. In this embodiment, the information may include thumbnail images corresponding to each layer in the subset. In addition, the information may include checkboxes corresponding to each layer in the subset. The information sent to the client device may be configured such that the thumbnail images and the checkboxes are displayed on a display associated with the client device in a manner that indicates that a particular checkbox corresponds to a particular layer. For example, a first checkbox may be rendered beside a first thumbnail image corresponding to a first layer, a second checkbox may be rendered beside a second thumbnail image corresponding to a second layer, and a third checkbox may be rendered beside a third thumbnail image. In this embodiment, if a particular checkbox is checked a visual indication is shown to the user configured to indicate that the layer corresponding to the thumbnail image is selected. The information can also be configured to enable a user to select and/or deselect one or more of the checkboxes. In this way, a user can determine which layers are selected.

As another example, in an embodiment, the information sent to a client device includes an image for each layer in the subset. In one embodiment, the information includes a program configured to allow a user to select and/or deselect one or more layers. The information may also include program code designed to provide a visual indication to a user regarding whether a particular layer is selected or not. For example, in an embodiment, the information sent to a client device is configured to enable a user to select and/or deselect a layer by contacting a touch-sensitive surface, such as a touch screen, at a location corresponding to the layer. Thus, in an embodiment, if a user contacts a touch screen display on the client device at a location corresponding to where a first image is shown on the display, then a layer corresponding to the first image may be selected. In one embodiment, an image border provides a visual indication as to whether a particular layer is selected. For example, an image border may be a solid, thin border if the layer corresponding to the image is not selected. As another example, an image border can be a thick, dashed border if the layer corresponding to the image is selected.

In some embodiments, the information sent to a client device includes program code configured to enable one or more of the layers to be ordered or reordered. In one embodiment, the ordering of one or more layers can be used to determine an order for which one or more of the layers should be flattened to generate a composite image. In one embodiment, ordering may be enabled by providing text boxes, drop down menus, or other user-selectable objects that allow a user to select a priority for one or more of the layers. In another embodiment, the ordering may be based on the order in which information corresponding to the layers are presented on a display. For example, in an embodiment, a first image corresponding to a first layer displayed first on a display has the highest priority, a second image corresponding to a second layer displayed second on the display (e.g., below the first image) has a lower priority, etc. In one embodiment, a user can change the priority of a layer by interacting with an image. For example, in an embodiment, a user can select the second image and drag the second image so that it is displayed before the first image. In this embodiment, the second layer corresponding to the second image may then have a higher priority than the first layer corresponding to the first image. In one embodiment, the information sent to the client device includes program code configured to enable a user to select one or more layers and make a gesture on a touch-sensitive input device, such as a touch screen, to change the priority of one or more of the layers.

The information can be sent in a single file or as multiple files. For example, in one embodiment, information corresponding to each layer in the subset is sent in a single HTML file to the client device. The information sent to the client device can include information about each layer in the subset. For example, the information may include a title or description, or both, for one or more layers in the subset of layers. The information sent to the client device may include markup, code, scripts, or other information usable by the client device to determine a user selection of one or more layers in the subset. In one embodiment, the information sent to the client device includes a layer image for each layer in the subset. In this embodiment, the layer images may be sent to the client device at full resolution (e.g., the same resolution as the layer image is stored on the server) or at full size, or both. In other embodiments, the layer images may be sent to the client device at a lower resolution or a smaller size, or both.

In embodiments, the information corresponding to each layer in the subset can be in any number of formats or written in any number of languages. The information may be written in a declarative language or in a procedural language, or a combination thereof. For example, information corresponding to each layer in the subset may be included in one or more electronic documents comprising one or more of the following languages, including, but not limited to: ActionScriptKO, ASP, C, C++, CSS, HTML, JAVA, JavaScript, JSON, MXML, PHP, XML, or XSLT. In embodiments, the information sent to the client device may be in an archive or compressed format, or both, such as JAR, ZIP, RAR, ISO, or TAR. In some embodiments, the information sent to the client device may be compiled whereas in other embodiments the information may not be compiled. A combination of languages and/or formats may be used to send information corresponding to each layer in the subset according to various embodiments.

In embodiments, the information corresponding to each layer in the subset is sent to a particular component being executed on the client device. For example, in an embodiment where web server 250 receives a request from desktop computer 230, the web server 250 may send the information corresponding to each layer in the subset to a particular application being executed by a processor in the desktop computer 230. Thus, the information corresponding to each layer in the subset can be sent to a particular application on the client device. In embodiments, the information corresponding to each layer in the subset can be sent to a web browser, an applet, a plug-in, a script, another suitable application, or a combination thereof.

Method of Receiving and Responding to a Request for a Composite Image

Figure 5:
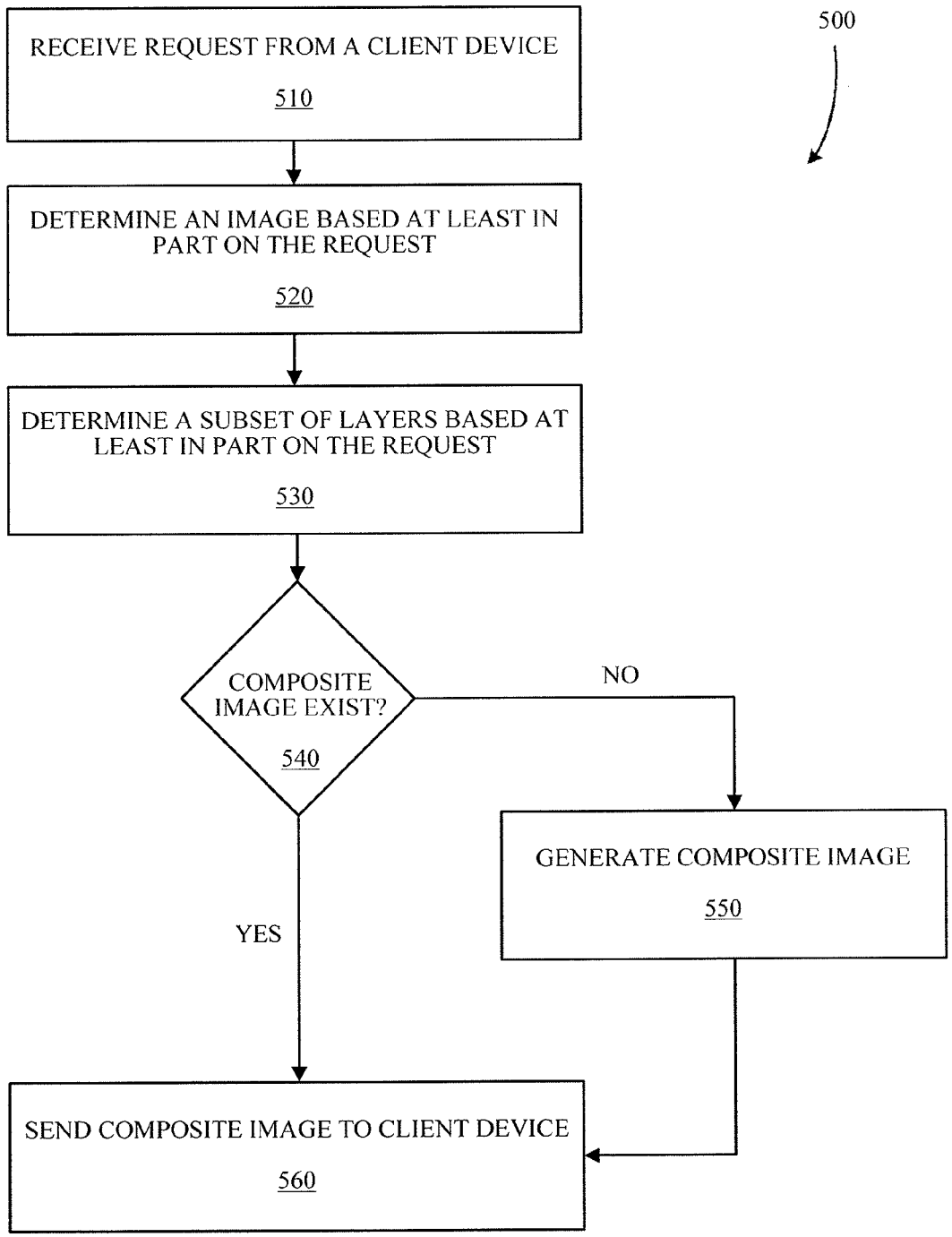
FIG. 5 is a flow chart illustrating a method of receiving and responding to a request for a composite image according to an embodiment.

Referring now to FIG. 5, FIG. 5 illustrates a flow chart directed to a method 500 of receiving and responding to a request for a composite image according to an embodiment. The description of the method 500 of FIG. 5 will be made with respect to FIG. 2 according to an embodiment.

The method 500 shown in FIG. 5 begins when a request is received from a client device 510. For example, referring to FIG. 2, web server 250 may receive an HTTP request from tablet computer 220 through network 210.

A request may be sent by a client device and received by a server over any number of protocols. In one embodiment, a request is sent by a client device 220-240 and received by the web server 250 through network 210 over Hypertext Transfer Protocol (HTTP). In another embodiment, a request is sent by a client device 220-240 and received by the web server 250 through network 210 over Hypertext Transfer Protocol Secure (HTTPS). A request may be received over HTTP or other stateless transport mechanism. Such a stateless transport mechanism may be associated with a protocol that has at least some characteristics that are similar to HTTP. Numerous additional embodiments and implementations will be obvious to one of skill in the art.

A request may include information usable by the receiving device to determine whether a playlist needs to be generated. In one embodiment, a request includes one or more Uniform Resource Identifiers (URIs). Examples of URIs include, but are not limited to, Uniform Resource Locators (URLs) and Uniform Resource Names (URNS). A URI can have any number of schemes. Examples of URI schemes include, but are not limited to, FTP, H323, HTTP, HTTPS, Real Time Streaming Protocol (RTSP), Real Time Messaging Protocol (RTMP), Java Archive (JAR), User Datagram Protocol (UDP), and Extensible Resource Identifier (XRI). In some embodiments, a URI conforms to RFC 3986 "Uniform Resource Identifier (URI): Generic Syntax" available at http://www.ietf.org/rfc/rfc3986.txt which is hereby incorporated by reference. A request having a URI may contain information including, but not limited to, some or all of the following: a scheme name, user information such as a username or a password or both, a hostname, a port, a path, a query, and a fragment.

Referring back to FIG. 5, after receiving a request from a client device 510, the method 500 proceeds to block 520. In block 520, an image is determined based at least in part on the received request. For example, web server 250 may determine an image based at least in part on a request received from tablet computer 220 through network 210.

In determining an image based at least in part on the request, a server receiving a request may parse or otherwise analyze the received request. A server receiving a request may parse or otherwise analyze a URI of a received request. For example, an image may be determined based at least in part on a path specified in a URI of a received request. In one embodiment, at least a portion of a path specified in a request is separated by a delimiter, such as a "/", "&", or ":". In such an embodiment, the path may be used to determine information usable by the server to determine an image. For example, referring to FIG. 2, if "/myImage/" is a path specified in a request received by web server 250, the web server 250 may determine that the image should be an image having the name "myImage". In another embodiment, if a request includes a path "/getImageLayers/myImage/", then a server receiving the request may determine that the request corresponds to a request for one or more layers of an layered image having the name "myImage".

An image may be determined based at least in part on a filename specified in a request. For example, a portion of a URI in a request may be interpretable by a server receiving the request as a filename. As one example, if a server receives a request from a client device and the request contains "imageName=whiteTruck2012", then the server may determine that an image associated with the request has a name of "whiteTruck2012". In some embodiments, the server searches cache, memory, and/or a disk drive to determine whether the server has access to an image having the name of the image specified in the request (i.e., "whiteTruck2012" in the previous example) in determining an image based at least in part on the request.

An image may be determined based at least in part on a location specified in a request. For example, a portion of a URI in a request may be interpretable by a server receiving the request as a location, or part of a location, of an image associated with the request. As one example, if a server receives a request from a client device and the request contains "imageLoc=folder1.folder2.folder3.myImage", then the server may determine that the request is associated with an image having the name "myImage" and that the image is located in a folder named "folder3" and that "folder3" is located within "folder2" and that "folder1" is located within "folder1". In at least this way, the request may specify a location of an image associated with a request that the server can use to determine the image.

An image may be determined based at least in part on an image identifier specified in a request. For example, at least a portion of a URI in a request may be interpretable by a server receiving the request as an image identifier. As one example, if a server receives a request from a client device and the request contains information indicating that the request is associated with an image corresponding to an image identifier of "asdf1234", then the server may determine an image based on the identifier contained in the request. For example, the server may query one or more data stores to determine a location of the image that corresponds with the image identifier of "asdf1234" received in the request. In one embodiment, an image identifier comprises one or more images. For example, in one embodiment, an image is determined because the image is sent in the request. In this embodiment, the image may comprise one or more layers.

An image may be determined based at least in part on information associated with one or more layers of the image received in a request. For example, at least a portion of a URI may be interpretable by a server receiving the request as a layer identifier. As one example, if a server receives a request from a client device and the request includes "toggleLayer=LID140", then the server may determine that the request corresponds to a layer having a layer identifier of "LID140". In this embodiment, the server may query one or more data stores to determine that the layer corresponding to "LID140" is associated with a particular image. For example, in one embodiment, the server can determine an image identifier of an image associated with a layer of an image. In this embodiment, the server can then use the image identifier to query a database to determine an image associated with the request.

An image can be determined based on a file extension specified in a request. For example, a portion of a URI in a request may be interpretable by a server receiving the request as a file extension. In one embodiment, if the path "/folder1/imageName.psd" is received in a request by a server, then the server may determine that the image is a PSD image having the name "imageName". Thus, if the server is able to access a first image having the name "imageName.gif", a second image having the name "imageName.jpg", and a third image having the name "imageName.psd", then the server may determine that the image is the third image having the name "imageName.psd" based at least in part on the file extension specified in the request.

An image may be based on a query or URI fragment, or both, specified in a request. For example, a query or fragment specified in a URI in a request may be interpretable by a server receiving the request to determine an image associated with the request. In one embodiment, a query or fragment, or both, received in a request may be used to specify a file extension that the server uses to determine an image associated with the request. For example, a query or fragment, or both, in a received request may contain the text "fileExt=PSD" which the server uses to determine that the request corresponds to an image having a ".psd" file extension. In another embodiment, a query or URI fragment, or both, received in a request may be used to determine an Internet media type, Multipurpose Internet Mail Extensions (MIME-type), and/or a content-type which the server can use to determine an image. In this embodiment, the server receiving the request may determine at least a portion of an image based on the determined media type, MIME-type, and/or content-type. For example, a query or a fragment received in a request, or some other portion of the request, may contain the text "mimeType=image/photoshop" which the server uses to determine an image associated with the received request.

An image can be determined based on whether a server receiving a request can access a file specified in a request. For example, a request may indicate a client device wants one or more layers of a layered image having a filename of "lakePhoto.psd". In one embodiment, if the server cannot access the file "lakePhoto.psd" stored in a cache, memory, or a disk drive associated with the server, then the server may determine an image that is determined to be close to the requested file. For example, if the server cannot access "lakePhoto.psd" but can access "lakePhoto1.psd", then the server may determine that the image based at least in part on the request is "lakePhoto1.psd". In another embodiment, if the request specifies a file having the name "golfPhoto.jpg" and the server cannot access "golfPhoto.jpg" but can access "golfPhoto.psd", then the server determines that the image is "golfPhoto.psd". In yet another embodiment, the server may determine another image associated with a request even if the server can access the requested file. For example, in one embodiment, the request may specify a file having the name "tennisPhoto.jpg". In this embodiment, the server may be able to access "tennisPhoto.jpg" but the server may determine that the image based at least in part on the request is "tennisPhoto.psd" because the PSD file has multiple layers and the JPG file does not.

An image based at least in part on the request may be determined based at least in part on a combination of two or more of a URI, path, filename, file extension, Internet content type, MIME-type, content-type, protocol, query, fragment, etc. specified in a request. In some embodiments, an image may be determined based at least in part on one or more of a filename, file extension, Internet content type, MIME-type, content-type, or protocol determined by a server receiving the request based at least in part on information contained in the request. For example, a server may access one or more data stores to determine an image associated with a request based at least in part on a received request. Numerous additional embodiments and implementations would be obvious to one of ordinary skill in the art.

Referring back to FIG. 5, after determining an image based at least in part on the request 520, the method 500 proceeds to block 530. In block 530, a subset of layers associated with the image is determined. For example, web server 250 may determine a subset of layers based at least in part on information contained in a request received from mobile phone 230 through network 210.

In determining a subset of layers associated with the image, a server receiving a request may parse or otherwise analyze the received request. A server receiving a request may parse or otherwise analyze a URI of a received request. For example, a subset of layers corresponding to an image may be determined based at least in part on a path specified in a URI of a received request. In one embodiment, at least a portion of a path specified in a request is separated by a delimiter, such as a "/", "&", or ":". In such an embodiment, the path may be used to determine information usable by the server to determine a subset of layers. For example, referring to FIG. 2, if "/layer1/layer5/layer6/" is a path specified in a request received by web server 250, the web server 250 may determine that the subset of layers comprises layer 1, layer 5, and layer 6 associated with the determined image. In another embodiment, if a request includes a path "/getImageLayers/layers1-4/", then a server receiving the request may determine that the subset of layers comprises layer 1, layer 2, layer 3, and layer 4 associated with the determined image.

A subset of layers may be determined based at least in part on a filename specified in a request. For example, a portion of a URI in a request may be interpretable by a server receiving the request as a filename. As one example, if a server receives a request from a client device and the request contains "imageName=whiteTruck2012", then the server may determine that the subset of layers comprises at least a portion of the layers associated with an image having the name "whiteTruck2012". In one embodiment, the server receiving the request may query one or more data stores to determine the subset of layers. For example, referring to FIG. 2, web server 250 may query data store 260 to determine which layers associated with the "whiteTruck2012" image should be included in the subset of layers. In one embodiment, the data store 260 comprises information about each layer of an image that indicates whether information about the layer should be sent in response to a request from a client device. In some embodiments, the server searches cache, memory, and/or a disk drive to determine whether the server has access to information corresponding to one or more layers of the determined image having the name of the image specified in the request (i.e., "whiteTruck2012" in the previous example) to determine the subset of layers.

A subset of layers may be determined based at least in part on a location specified in a request. For example, a portion of a URI in a request may be interpretable by a server receiving the request as a location, or part of a location, of one or more layers of an image associated with the request. As one example, if a server receives a request from a client device and the request contains "layerLoc=folder1.folder3", then the server may determine that the layers associated with the image that should be included in the subset of layers are located in a folder named "folder3" and that "folder3" is located within "folder1". In at least this way, the request may specify a location of one or more image layers to be included in the subset of layers.

A subset of layers may be determined based at least in part on one or more layer identifiers specified in a request. For example, at least a portion of a URI in a request may be interpretable by a server receiving the request as a layer identifier. As one example, if a server receives a request from a client device and the request contains information indicating that the request is associated with a layer identifier of "layer4643", then the server may determine to include a layer corresponding to "layer4643" in the subset.

In embodiments, a device receiving a request may query one or more data stores in determining the subset of layers. For example, web server 250 may receive a request from phone 240 and the web server 250 may query data store 260 in determining the subset of layers. In one embodiment, data store 260 comprises information corresponding to images, image layers, access rights, user information, and/or other information usable in determining a subset of layers. For example, the server may query one or more data stores to determine a location of a lower-resolution thumbnail image of a layer corresponding to a layer identifier. In one embodiment, if the web server 250 is unable to access the location of the lower-resolution thumbnail image of the layer, then that layer is not included in the subset. In another embodiment, if the web server 250 is unable to access the location of the lower-resolution thumbnail image of the layer, then the web server 250 may generate the low-resolution thumbnail image by accessing a high-resolution image of the layer and converting the layer into the low-resolution thumbnail image. In this embodiment, the web server 250 may include the layer corresponding to the generated thumbnail image in the subset. As another example, web server 250 can query data store 260 to determine whether a layer is locked. In this embodiment, the web server 250 may determine that the layer should not be included in the subset. In other embodiments, the web server 250 may include the layer in the subset even if the layer is locked in the data store 260. Numerous other embodiments are disclosed herein and others are within the scope of this disclosure.

A subset of layers may be determined based at least in part on information associated with one or more layers or one or more images, or both, received in a request. For example, at least a portion of a URI may be interpretable by a server receiving the request as a layer identifier. As one example, if a server receives a request from a client device and the request includes "useLayer=LID140", then the server may determine that a layer corresponding to the layer identifier of "LID140" should be included in the subset. Conversely, if a server receives a request from a client device and the request includes "doNotUse=LID140", then the server may determine that a layer corresponding to the layer identifier of "LID140" should not be included in the subset. In one embodiment, information received in the request is used to override one or more settings in a data store. For example, information contained in the data store may indicate that a layer associated with layer identifier "LID140" should be included in a subset, but the server may not include the layer in the subset because information in the request indicates that the layer should not be included in the subset. In at least this way, information contained in a request may be used to include or not include one or more layers in a subset that overrides information from another source. In other embodiments, information from another source—such as a data store—may override information contained in a request. For example, in this embodiment, the layer associated with layer identifier "LID140" may be included in the subset even if the request indicates that the layer should not be included in the subset because information in the data store overrides information contained in the request.

A subset of layers may be based on a query or URI fragment, or both, specified in a request. For example, a query or fragment specified in a URI in a request may be interpretable by a server receiving the request to determine whether one or more layers should or should not be included in the subset. In one embodiment, a query or fragment, or both, received in a request may be used to specify a layer to include in the subset of layers. In another embodiment, a query or fragment, or both, received in a request may be used to specify a layer that should not be included in the subset of layers.

A subset of layers may be determined based at least in part on a combination of two or more of a URI, path, filename, file extension, Internet content type, MIME-type, content-type, protocol, query, fragment, etc. specified in a request. In some embodiments, a subset of layers associated with the determined image may be determined based at least in part on one or more of a filename, file extension, Internet content type, MIME-type, content-type, or protocol determined by a server receiving the request based at least in part on information contained in the request. For example, a server may access one or more data stores to determine the layers of an image to be included in the subset. Numerous additional embodiments and implementations would be obvious to one of ordinary skill in the art.

Referring back to FIG. 5, after determining a subset of layers 530, the method 500 proceeds to block 540. In block 540, a determination is made as to whether a composite image exists. If the determination is made that the composite image does not exist, then the method 500 proceeds to block 550. If the determination is made that the composite image exists, then the method 500 proceeds to block 560.

In one embodiment, a determination as to whether a composite image exists involves querying one or more data stores. For example, a data store may contain information including a list of composite images. In this embodiment, web server 250 may query data store 260 to determine whether the data store contains a location for a composite image corresponding to the determined subset of layers. In one embodiment, a determination as to whether a composite image exists is based on an order, a priority, or both, of one or more layers. For example, in one embodiment, if a composite image was created using each of the determined layers, then a determination is made that the composite image exists. In another embodiment, a composite is determined to exist if the composite image was not only created using the determined layers but the layers were in the same order. In some embodiments, a storage device, such as cache, memory, and/or a disk drive is accessed to determine whether the web server can access a particular composite image. In this embodiment, if the web server 250 cannot access, or otherwise obtain, the particular composite image then a determination may be made that the composite image does not exist. Similarly, if the web server 250 can access, or otherwise obtain, the particular composite image then a determination may be made that the composite image exists. Numerous other variations are disclosed herein and others are within the scope of this disclosure.

Referring back to FIG. 5, if a determination is made that the composite image does not exist, then a composite image is generated 550. After generating the composite image 550, the method 500 proceeds to block 560.

A composite image can be generated based at least in part on the determined subset of layers. For example, in one embodiment, the composite image is generated by combining each of the layers in the subset and creating a flattened image. In an embodiment, the composite image is generated based on an order or a priority, or both, for one or more layers in the subset. For example, in one embodiment, each of the layers in the subset are retrieved and then ordered based on a priority. In this embodiment, a layer with a higher priority is arranged on top of a layer with a lower priority. After the layers have been ordered based on the priority, a flattened composite image is generated. Other examples of generating a composite image based at least in part on a priority, an order, or both, are disclosed herein.

In embodiments, information in one or more data stores may be accessed and/or updated in connection with generating the composite image. For example, in one embodiment, a data store is queried to determine a location for one or more of the layers in the subset. As another example, a data store may be queried to determine a priority or an order, or both, for one or more of the layers. In some embodiments, information corresponding to a generated composite image may be stored in one or more data stores. For example, a location of a generated image may be stored in the data store. Information regarding a quality of the composite image—such as whether the composite image is a high-resolution image, a low-resolution image, and/or a thumbnail—may be stored in a data store. In one embodiment, information regarding one or more of the layers used to generate the composite image is stored in a data store. For example, in an embodiment, a layer identifier and a layering order associated with a generated composite image is stored in a data store. In various embodiments, such information may be stored in another store device such as in cache, memory, disk drive, and/or other storage devices.

Referring back to FIG. 5, in block 560 the composite image is sent to the client device. For example, referring to FIG. 2, web server 250 may send the composite image to tablet computer 220 through network 210. In various embodiments, the composite image may be a high-resolution image, a low-resolution image, or a thumbnail image.

In one embodiment, the composite image is sent to the client device by referencing the composite image in another file. For example, the composite image may be referenced in an HTML file that is sent to the client device. In one embodiment, the HTML file can comprise markup that includes a thumbnail image of the composite image. At least a portion of the information received by the client device may be rendered on a display associated with the client device. For example, web server 250 may send an HTML file referencing a composite image to tablet computer 220 over HTTP if the tablet computer 220 sent the request to web server 250. The tablet computer 220 may receive the HTML file and render at least a portion of the information contained in the HTML file on a display associated with the tablet computer 220. For example, the tablet computer 220 may obtain and render the composite image based on information contained in the HTML file referencing a location of the composite image.

In embodiments, the composite image is sent to a particular component being executed on the client device. For example, in an embodiment where web server 250 receives a request from desktop computer 230, the web server 250 may send the composite image to a particular application being executed by a processor in the desktop computer 230. Thus, the composite can be sent to a particular application on the client device. In embodiments, the composite can be sent to a web browser, an applet, a plug-in, a script, another suitable application, or a combination thereof.

In embodiments, the composite image is embedded in or referenced by another file. For example, as discussed above, the composite image may be referenced in an HTML file. In embodiments, a file sent to the client device referencing and/or embedding the composite image can be in any number of formats or written in any number of languages. The file may be written in a declarative language or in a procedural language, or a combination thereof. For example, a file referencing or embedding the composite image may be included in one or more electronic documents comprising one or more of the following languages, including, but not limited to: ActionScript®, ASP, C, C++, CSS, HTML, JAVA, JavaScript, JSON, MXML, PHP, XML, or XSLT. In embodiments, a file sent to the client device may be in an archive or compressed format, or both, such as JAR, ZIP, RAR, ISO, or TAR. In some embodiments, a file sent to the client device may be compiled whereas in other embodiments the information may not be compiled. A combination of languages and/or formats may be used to send information corresponding to each layer in the subset according to various embodiments.

Illustrative Screenshots of a Display of a Client Device

Figure 6A:
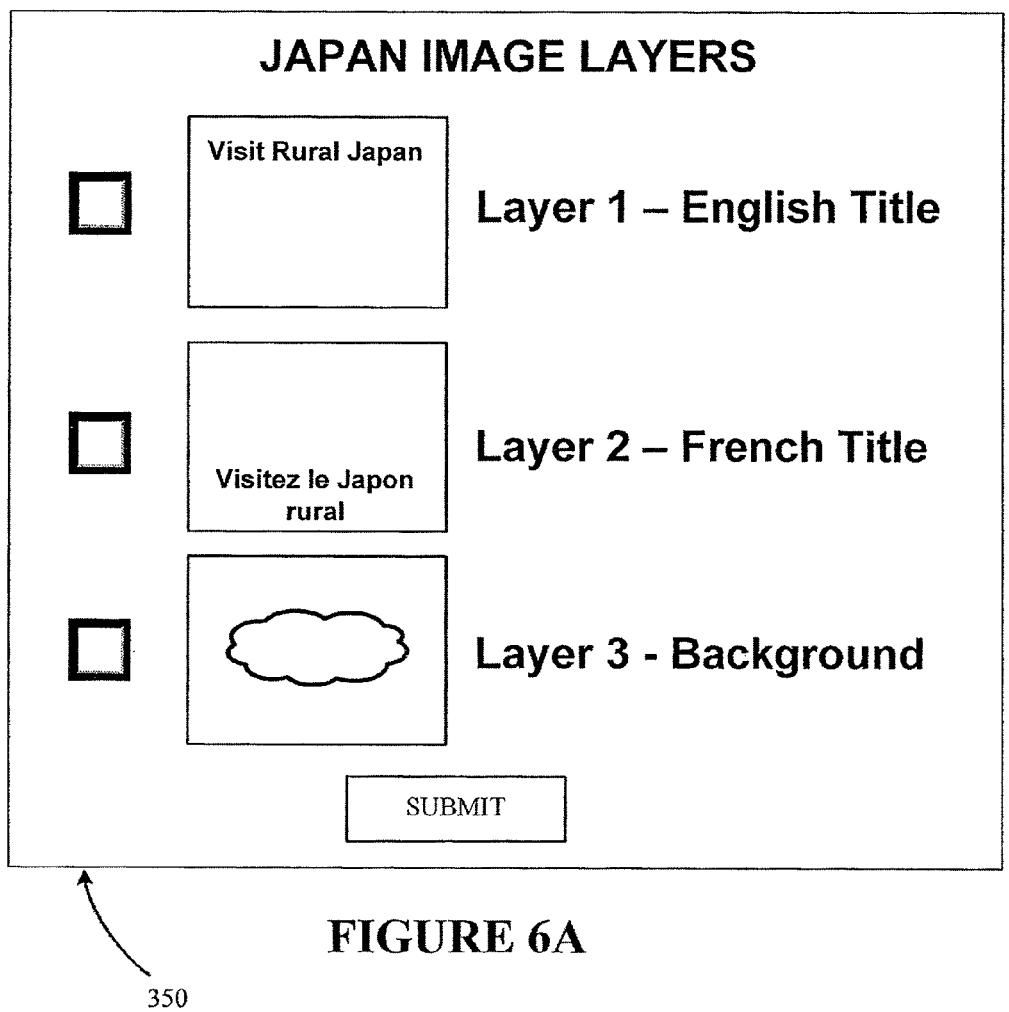
FIGS. 6A-C are simulated displays that illustrate aspects according to an embodiment.
Figure 6B:
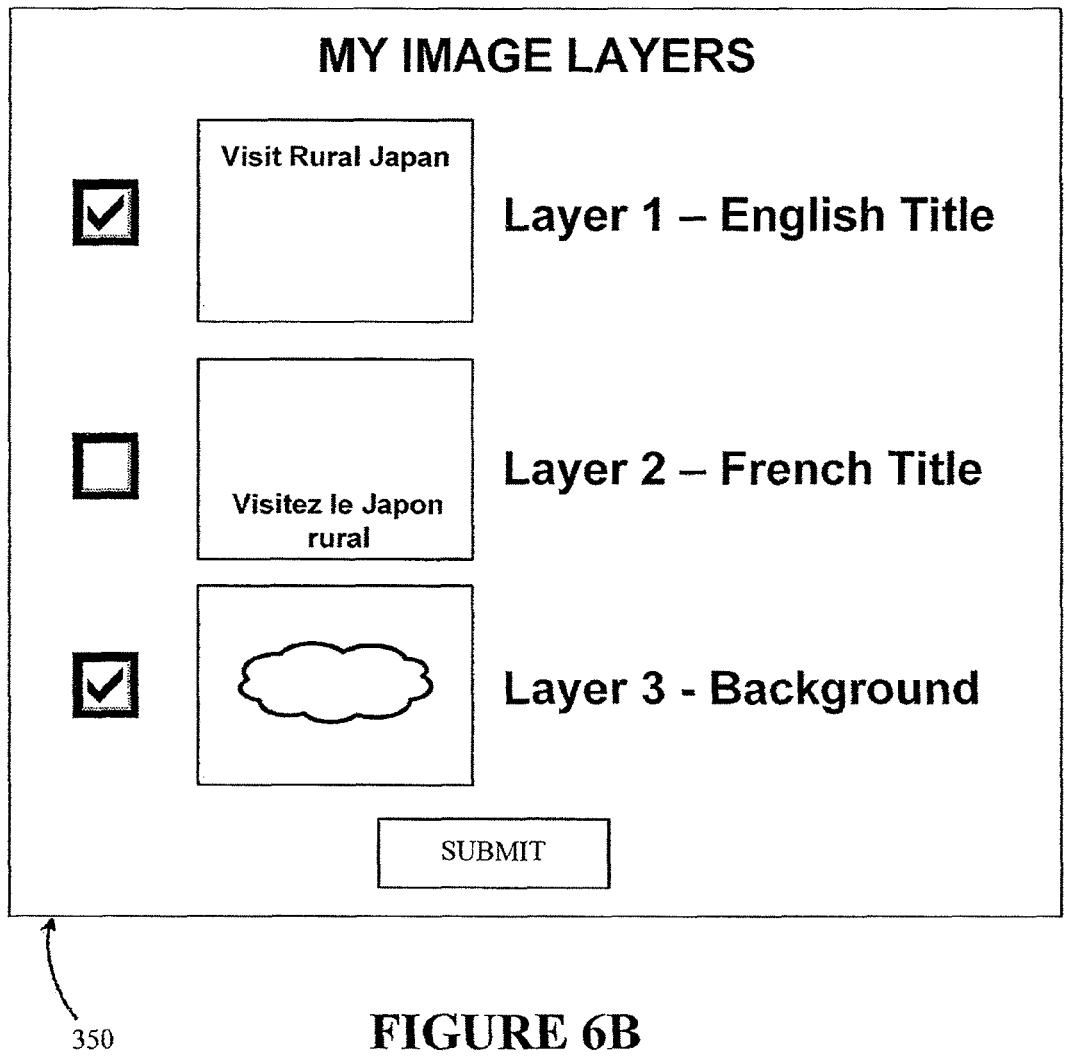
Figure 6C:
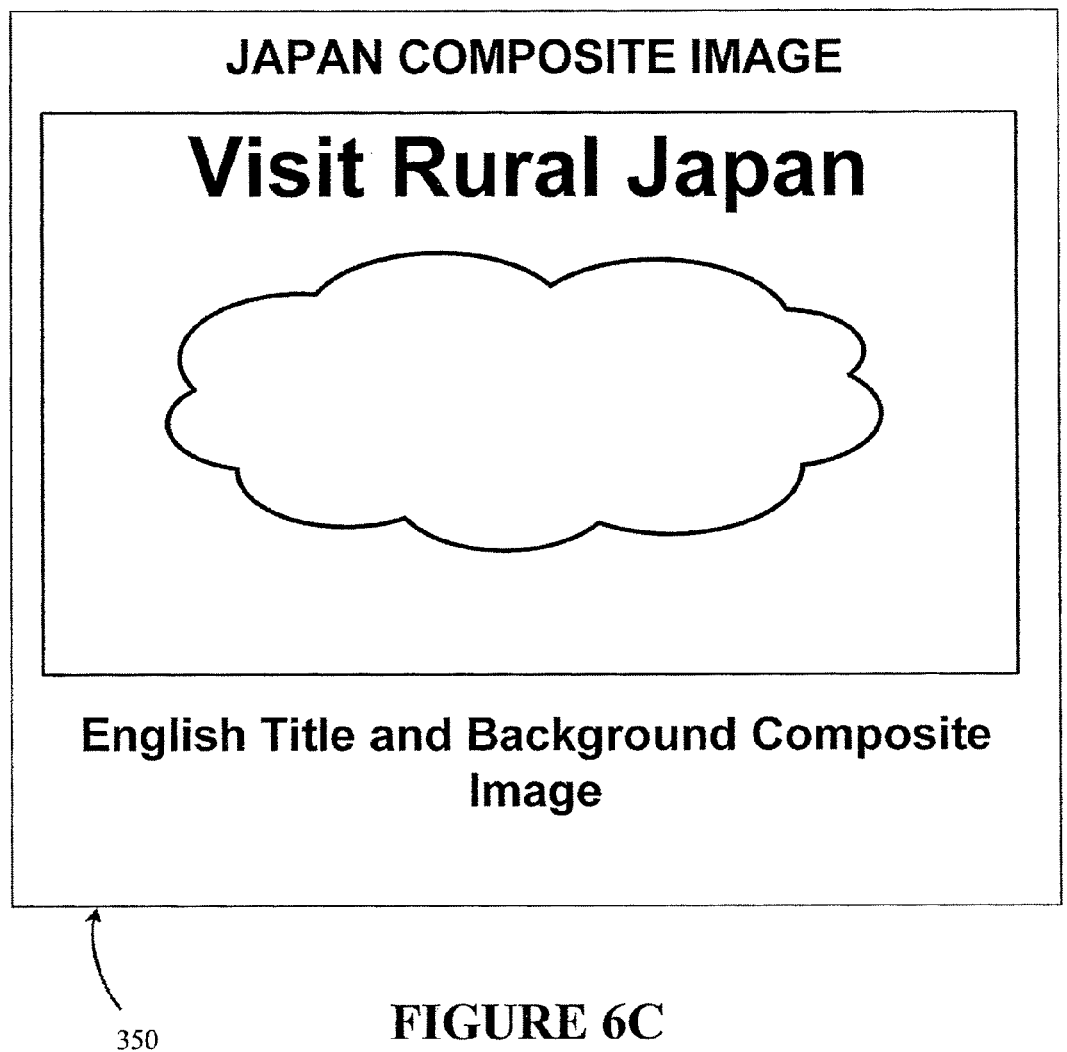

Referring now to FIGS. 6A-6C, these figures illustrate screenshots on a display 350 depicting aspects disclosed herein according to an embodiment. For example, in one embodiment, FIGS. 6A-6C illustrate information that may be rendered on a display 350 of a device 300 implementing at least a portion of one of the methods disclosed herein. In one embodiment, the device may be a client device, such as one or more of client devices 220-240. In this embodiment, the client device 220-240 may communicate with another device, such as web server 250, through a network, such as network 210, as depicted in FIG. 2.

FIG. 6A shows a screenshot of a display rendering information received corresponding to a plurality of layers of an image. In one embodiment, the information received by a client device corresponding to a plurality of layers of an image may be received in response to the client device sending a request requesting information associated. For example, desktop computer 230 may send a request to web server 250 requesting information associated with an image. In response to receiving the request, the web server 250 can send information corresponding to a plurality of layers of the image to the desktop computer 230. In this embodiment, the desktop computer 230 receives the response from the web server 250 and renders at least a portion of the content on a display associated with the client device. For example, in FIG. 6A, the client device has rendered information corresponding to three layers of an image. As shown in FIG. 6A, for each of the three layers, a checkbox is displayed as well as a thumbnail image representing the layer and a title of the layer.

In the embodiment, as shown in FIGS. 6A and 6B, a user can interact with the content shown on the display to select one or more layers. For example, a user may select "Layer 1" by checking the checkbox beside the thumbnail image corresponding to layer 1. One or more of the checkboxes may be selected by any suitable input device. For example, one or more of the checkboxes may be selected using a mouse associated with the client device or a touch-sensitive surface, such as a touch screen display, on the client device. As a user interacts with the client device, the display can be updated to reflect the user interaction. In one embodiment, the display is updated as a user interacts with the client device to visually indicate that one or more layers have been selected by the user. For example, if a user selects "Layer 1" and "Layer 3", then the display may be updated to check the checkboxes shown on the display corresponding to layer 1 and layer 3 as shown in FIG. 6B.

In one embodiment, a user can request a composite image based at least in part on one or more selected layers. For example, referring to FIG. 6B, the user can request a composite image based on layer 1 and layer 3 of the image by clicking the "Submit" button shown on the display. In response to receiving selection of the "Submit" button, the client device can send a request to another device for a composite image based on the selected layers. Thus, in one embodiment, the desktop computer 230 sends a request to the web server 250 through network 210 where the request is for a composite image associated with layers 1 and 3 of an image. In one embodiment, in response to receiving the request, the web server 250 retrieves or generates the composite image and sends the composite image to the desktop computer 230. The desktop computer 230 can receive the composite image and render the composite image on a display associated with the desktop computer 230. For example, FIG. 6C, illustrates a composite image corresponding to layer 1 and layer 3 of an image that the desktop computer 230 receives and renders on the display according to one embodiment. As shown in FIG. 6C, the composite image may comprise a flattened representation of the layers that the user selected.

Illustrative Screenshots of a Display of a Client Device

Figure 7A:
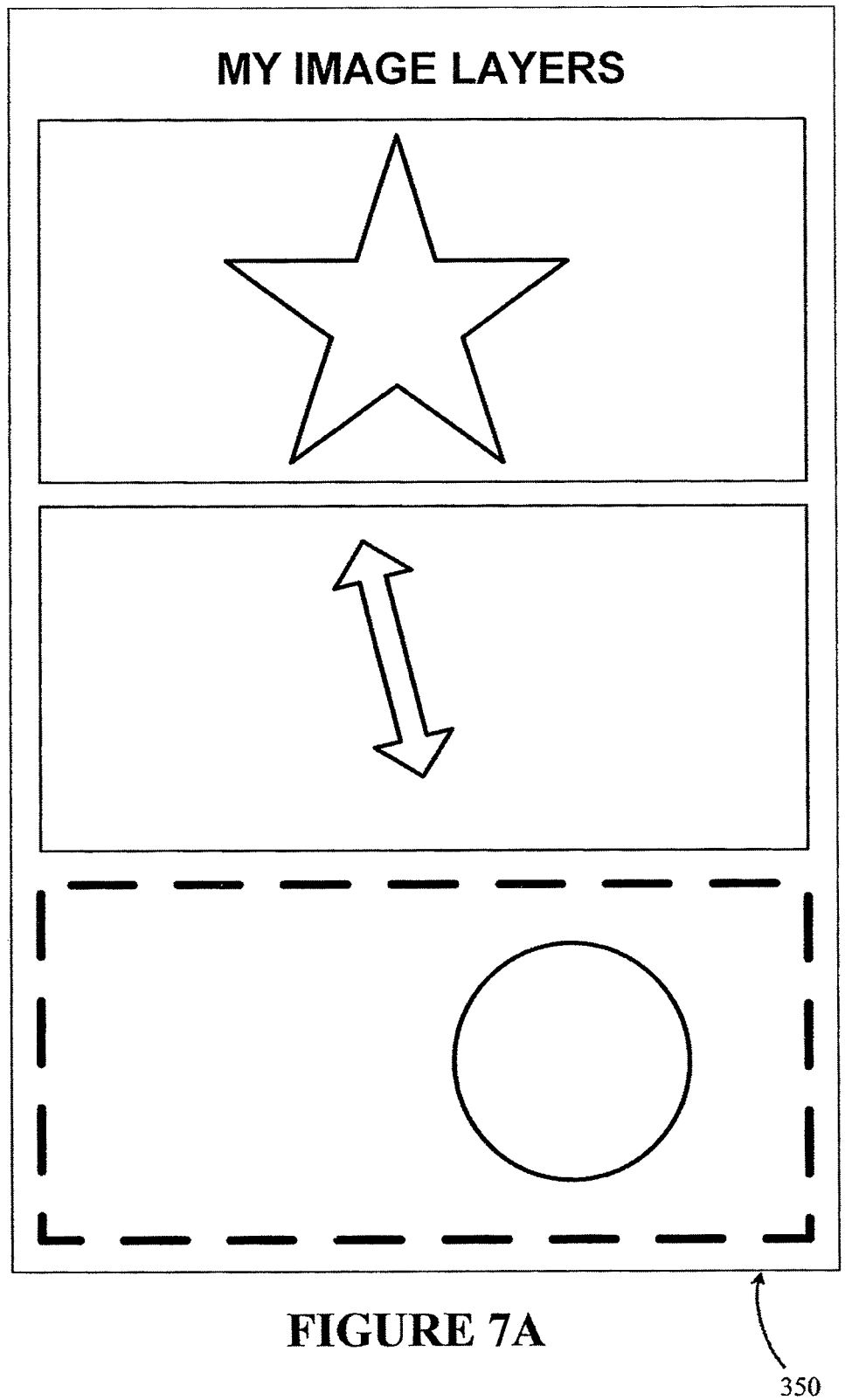
FIGS. 7A-F are simulated displays that illustrate aspects according to an embodiment.
Figure 7B:
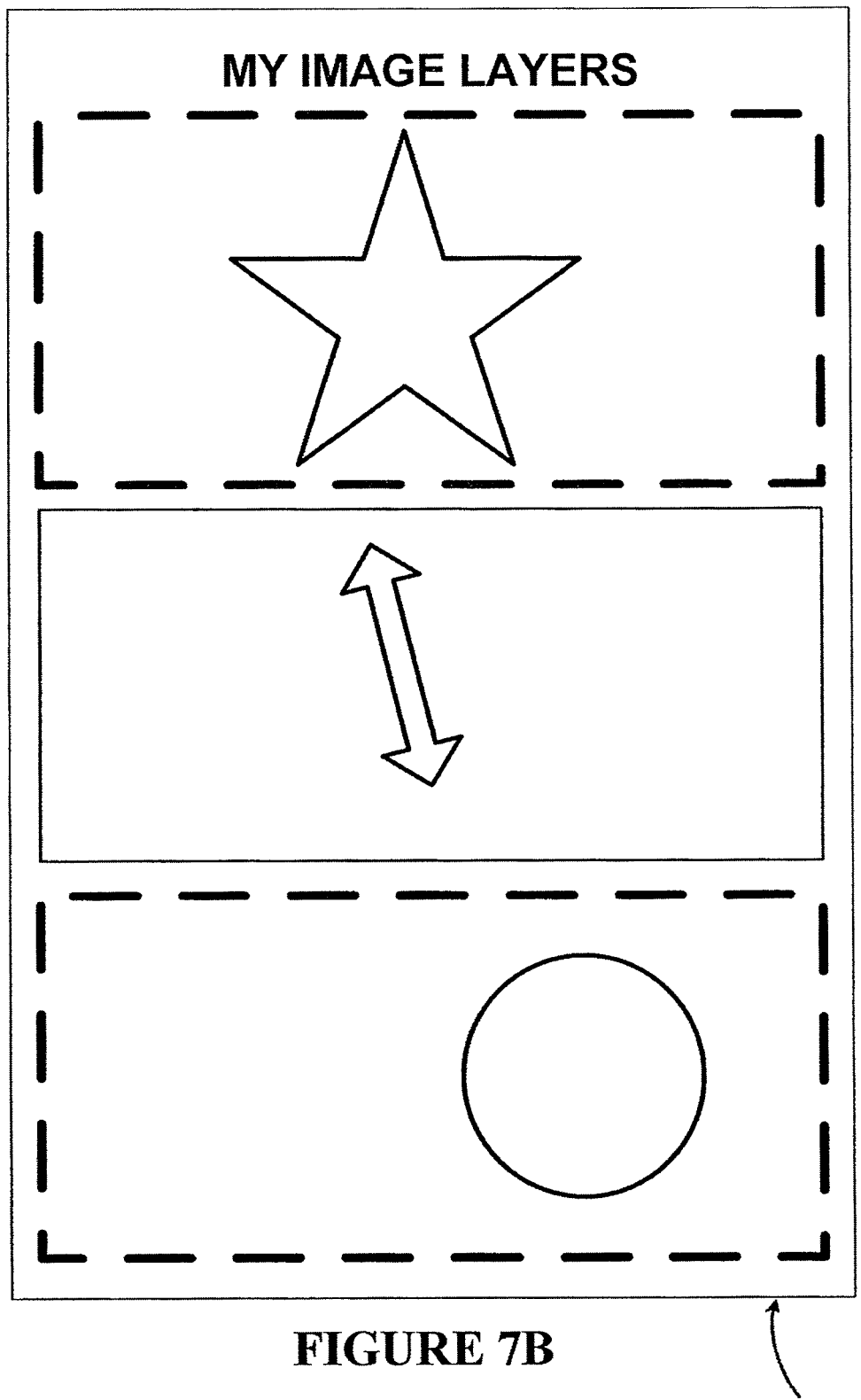
Figure 7C:
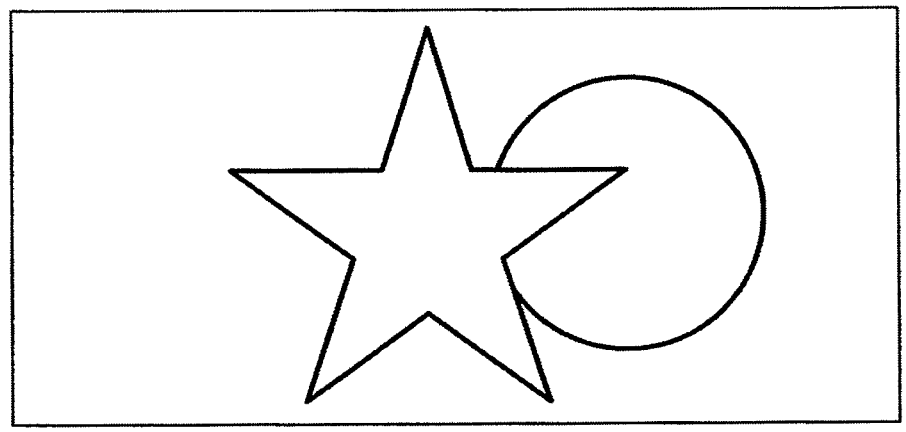

Referring now to FIGS. 7A-7F, these figures illustrate screenshots on a display 350 depicting aspects disclosed herein according to an embodiment. For example, in one embodiment, FIGS. 7A-7C illustrate information that may be rendered on a display 350 of a device 300 implementing at least a portion of one of the methods disclosed herein. In one embodiment, the device may be a client device, such as one or more of client devices 220-240. In this embodiment, the client device 220-240 may communicate with another device, such as web server 250, through a network, such as network 210, as depicted in FIG. 2.

FIG. 7A shows a screenshot of a display rendering information received corresponding to a plurality of layers of an image. In one embodiment, the information received by a client device corresponding to a plurality of layers of an image may be received in response to the client device sending a request requesting information associated. For example, tablet computer 220 may send a request to web server 250 requesting information associated with an image. In response to receiving the request, the web server 250 can send information corresponding to a plurality of layers of the image to the tablet computer 220. In this embodiment, the tablet computer 220 receives the response from the web server 250 and renders at least a portion of the content on a display associated with the client device. For example, in FIG. 7A, the client device has rendered information corresponding to three layers of an image. In this embodiment, the first layer with a star, the second layer with an arrow, and the third layer with a circle.

In the embodiment shown in FIG. 7A, an image border provides a visual indication as to whether a particular layer is selected. For example, an image border may be a solid, thin border if the layer corresponding to the image is not selected. As another example, an image border can be a thick, dashed border if the layer corresponding to the image is selected. Thus, as shown in FIG. 7A, the third layer with a circle is selected and the first and second layers are not selected. In one embodiment, one or more layers are selected based on the information received from another device. For example, in FIG. 7A, the tablet computer 220 may receive information from the web server 250 which is usable by the tablet computer 220 to determine that the third layer should be displayed as being selected. Thus, in one embodiment, the third layer shown in FIG. 7A is selected based on information received from another device and without receiving user input. In other embodiments, the third layer shown in FIG. 7A may be selected based on a user interaction with the tablet computer 220.

In the embodiment, as shown in FIGS. 7A and 6B, a user can interact with the content shown on a touch-sensitive display of the tablet computer 220 to select one or more layers. For example, a user may select the first layer with the star by touching a location on the touch-sensitive display corresponding to the first layer. For example, if the user touches a location on the display corresponding to the star, then the first layer may be selected. As a user interacts with the client device, the display can be updated to reflect the user interaction. Thus, if the user selects the first layer with the star, then the touch-sensitive display of the tablet computer 220 may be updated to reflect that the first layer is selected as shown in FIG. 7B.

In one embodiment, the tablet computer 220 can send a request for a composite image based at least in part on one or more selected layers of an image. For example, in one embodiment, the tablet computer 220 sends a request to the web server 250 through network 210 and the request is for a composite image corresponding to the selected layers 1 and 3 of an image as shown in FIG. 7B. In one embodiment, in response to receiving the request, the web server 250 retrieves or generates the composite image and sends the composite image to the tablet computer 220. The tablet computer 220 can receive the composite image and render the composite image on the touch-sensitive display on the tablet computer 220. For example, FIG. 7C, illustrates a composite image corresponding to the first layer and the third layer of an image that the tablet computer 220 receives and renders on the display according to one embodiment. As shown in FIG. 7C, the composite image may comprise a flattened representation of the layers that the user selected.

In one embodiment, the composite image is based on an ordering of one or more selected layers. In an embodiment, the ordering is based on the order in which the layers are displayed on the display. For example, referring to FIG. 7B, the first layer with the star may have a higher priority than the third layer with the circle because the first layer with the star is displayed before the third layer with the circle. In this embodiment, the tablet computer 220 may send information associated with the ordering or the priority, or both, of the layers to the web server 250. In some embodiments, the composite image generated or retrieved by the web server 250 is based at least in part on the ordering or priority, or both. For example, if a request for a composite image is made using the selected layers and priority as discussed above and shown in FIG. 7B, then the web server may generate a composite image where the first layer is placed on top of the third layer before the image is flattened to create the composite image. Thus, if the tablet computer 220 receives this composite image from the web server 250, the tablet computer 220 can render the composite image on the display. As shown in FIG. 7C, the entire star is shown on the flattened composite image, but only a portion of the circle.

Figure 7D:
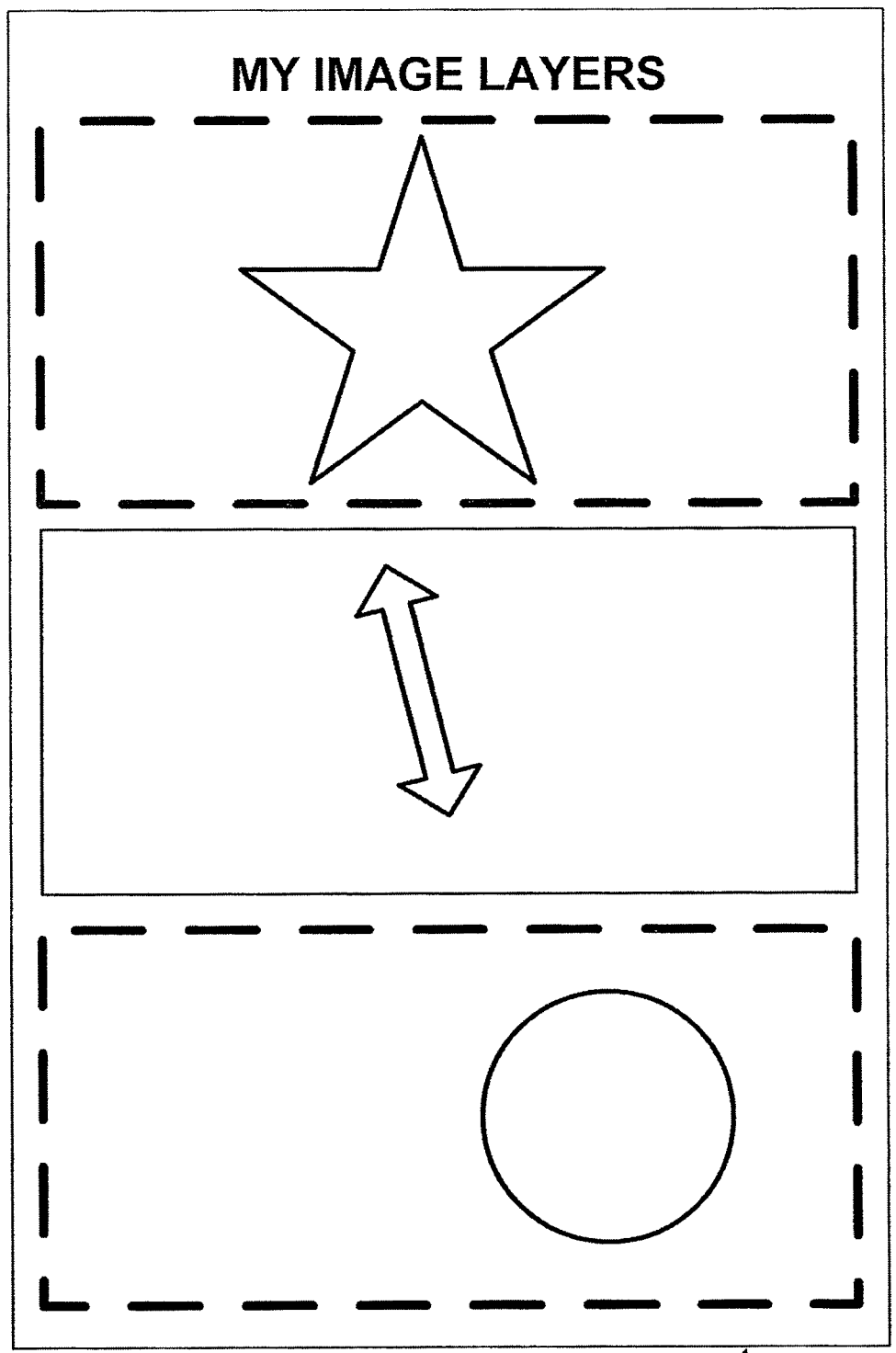
Figure 7E:
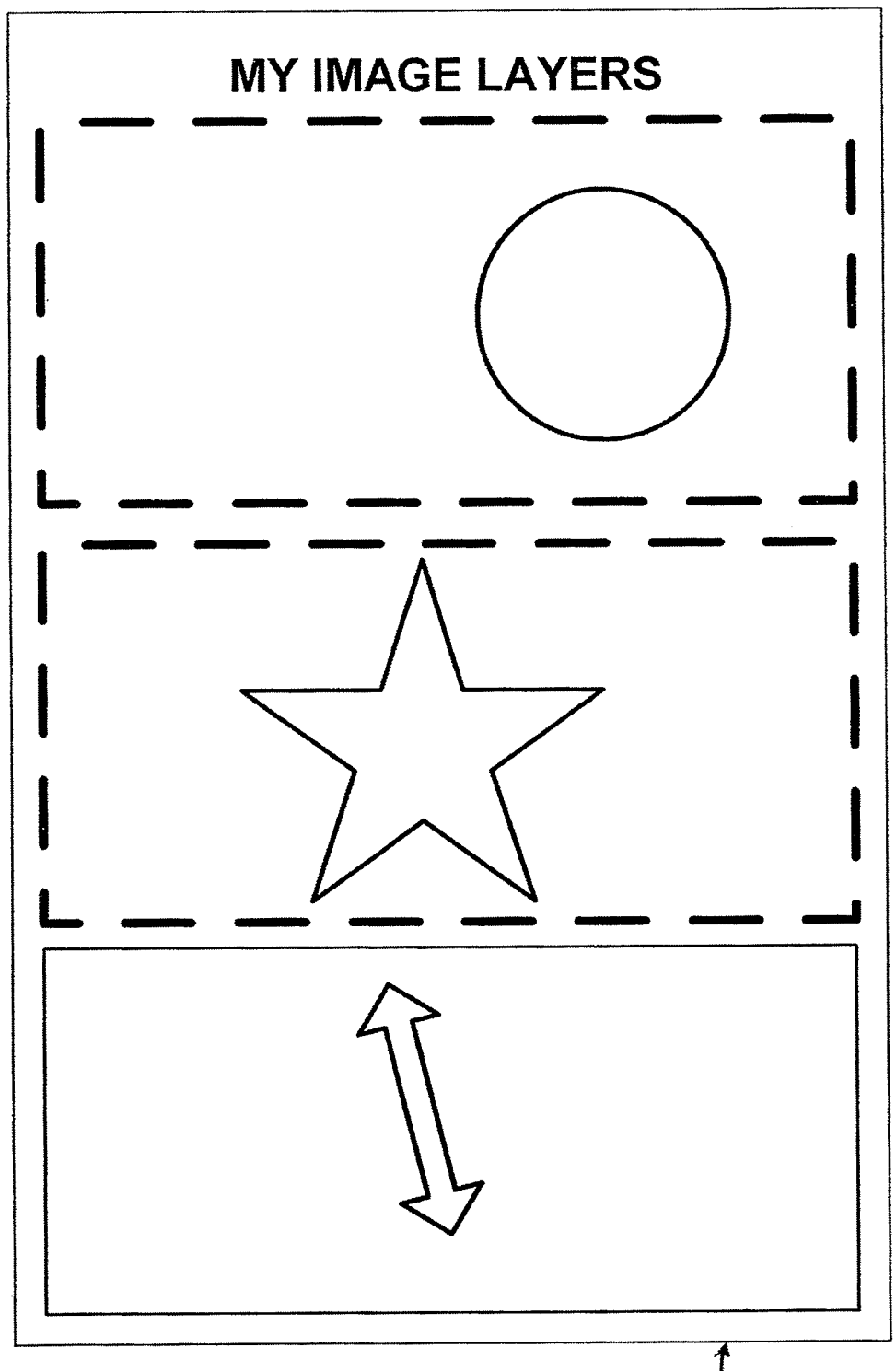
Figure 7F:
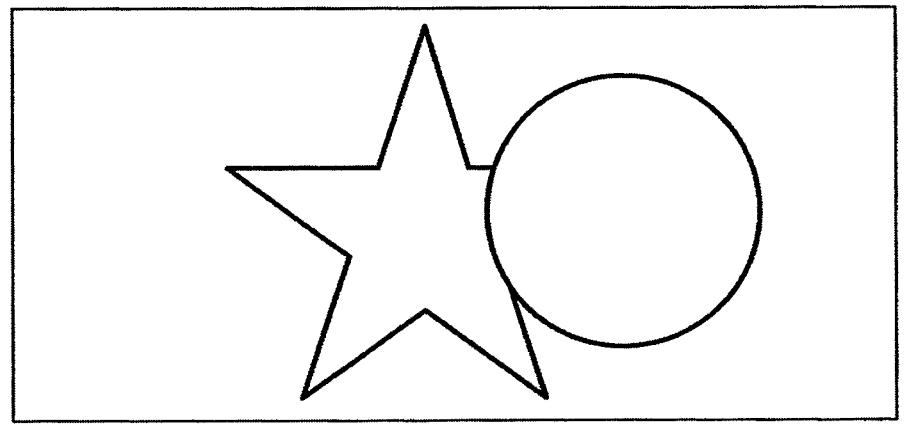

In one embodiment, the order or priority, or both, of one or more layers can be changed based at least in part on a user interaction with the tablet computer 220. For example, FIG. 7D illustrates an embodiment where the first layer associated with the star and the second layer associated with the circle are selected. In the embodiment shown in FIG. 7D, the first layer with the star has a higher priority than the third layer with the circle because the first layer is displayed first. In embodiments, a user can change the ordering or priority, or both, based on a gesture made on the touch screen display of the tablet computer 220. Thus, in an embodiment, if the user contacts a location on the touch screen display corresponding to the third layer with the circle and, while continuing to contact the display, makes a gesture towards the top of the screen, then the priority of the third layer may be changed. In one embodiment, the display may be updated to reflect the change in priority. For example, FIG. 7E shows that the display is updated to reflect that the third layer with the circle now has a higher priority than the first layer with the star after the gesture is made. Therefore, if a request is sent by the tablet computer 220 to the web server 250 for a composite image using the selected layers, the composite image received may be different than the composite image rendered in FIG. 7C because of the ordering or priority, or both, of the selected layers. For example, in one embodiment, the tablet computer 220 receives and renders the composite image as shown in FIG. 7F in response to a request made by the tablet computer 220 where the request is based on the selected layers and ordering of the layers shown in FIG. 7E. In this embodiment, the entire circle is shown and only a portion of the star is shown at least in part because of the priority or order, or both, of the layers used to generate the composite image.

General

Numerous specific details are set forth herein to provide a thorough understanding of the claimed subject matter. However, those skilled in the art will understand that the claimed subject matter may be practiced without these specific details. In other instances, methods, apparatuses or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

Therefore, the following is claimed:

1. A method for generating a composite image from a multilayer image in a client-server environment, the method comprising:

receiving, by a server via a network, a request comprising image search criteria and a layer selection;

identifying, by the server, a multilayer image from a plurality of possible multilayer images based on the image search criteria;

selecting, by the server, layers of the multilayer image based on the layer selection;

generating, by the server, a flattened composite image comprising image data from only the selected layers of the multilayer image; and sending, by the server, the flattened composite image to a client device that initiated the request.

2. The method of claim 1, wherein the image search criteria comprises a plurality of different selection criteria, said identifying the multilayer image comprises satisfying the plurality of different selection criteria.

3. The method of claim 1, wherein the multilayer image is one of a plurality of multilayer images identified by the image search criteria, the server generating a plurality of a flattened composite images that correspond to the plurality of identified multilayer images and the layer selection.

4. The method of claim 1, wherein said generating the flattened composite image comprises determining a priority for the selected layers of the multilayer image.

5. The method of claim 4, wherein the priority is specified as part of the request.

6. The method of claim 1, wherein the image search criteria comprises at least one of: an image identifier, an image location, a layer identifier, and a file extension.

7. The method of claim 1, wherein the layer selection is determined by the server based on at least one of: a default layer selection for the multilayer image, a path specified as part of a uniform resource identifier (URI), and identifiers for the layers.

8. The method of claim 1, further comprising:
determining whether a composite image exists that corresponds to the selected layers of the multilayer image, wherein said generating the flattened composite image occurs in response to determining that the composite image does not exist in a data store accessible by the server.

9. The method of claim 1, wherein the client device comprises at least one of: a tablet computer, a mobile phone, and a personal digital assistant (PDA).

10. A non-transitory computer-readable medium embodying a program that, when executed in a computer, generates a composite image from a multilayer image in a client-server environment, the program comprising:
code that receives, via a network, a request comprising image search criteria and a layer selection;
code that identifies a multilayer image from a plurality of possible multilayer images based on the image search criteria;
code that selects layers of the multilayer image based on the layer selection;
code that generates a flattened composite image comprising image data from only the selected layers of the multilayer image; and
code that sends the flattened composite image to a client device that initiated the request.

11. The non-transitory computer-readable medium of claim 10, wherein the image search criteria comprises a plurality of different selection criteria, said code that identifies the multilayer image comprises satisfying the plurality of different selection criteria.

12. The non-transitory computer-readable medium of claim 10, wherein the multilayer image is one of a plurality of multilayer images identified by the image search criteria, the computer generating a plurality of a flattened composite images that correspond to the plurality of identified multilayer images and the layer selection.

13. The non-transitory computer-readable medium of claim 10, wherein the image search criteria comprises at least one of: an image identifier, an image location, a layer identifier, and a file extension.

14. The non-transitory computer-readable medium of claim 10, wherein said code that generates the flattened composite image comprises determining a priority for the selected layers of the multilayer image.

15. A system, comprising:
a server device comprising a processor and a memory; and
a plurality of instructions that, when executed by the processor of the server device, cause the server device to:
receive, via a network, a request comprising image search criteria and a layer selection;
identify a multilayer image from a plurality of possible multilayer images based on the image search criteria;
select layers of the multilayer image based on the layer selection;
generate a flattened composite image comprising image data from only the selected layers of the multilayer image; and
send the flattened composite image to a client device that initiated the request.

16. The system of claim 15, wherein the image search criteria comprises a plurality of different selection criteria, said identifying the multilayer image comprises satisfying the plurality of different selection criteria.

17. The system of claim 15, wherein the multilayer image is one of a plurality of multilayer images identified by the image search criteria, the server device generating a plurality of a flattened composite images that correspond to the plurality of identified multilayer images and the layer selection.

18. The system of claim 15, wherein the instructions further cause the server device to:
determine whether a composite image exists that corresponds to the selected layers of the multilayer image, wherein said generating the flattened composite image occurs in response to determining that the composite image does not exist in a data store accessible by the server device.

19. The system of claim 15, wherein the client device comprises at least one of: a tablet computer, a mobile phone, and a personal digital assistant (PDA).

20. The system of claim 15, wherein the layer selection is determined by the server device based on at least one of: a default layer selection for the multilayer image, a path specified as part of a uniform resource identifier (URI), and identifiers for the layers.

* * * * *